US008048968B2

(12) United States Patent
Phelan et al.

(10) Patent No.: US 8,048,968 B2
(45) Date of Patent: Nov. 1, 2011

(54) POLYSILOXANE COPOLYMERS WITH TERMINAL HYDROPHILIC POLYMER CHAINS

(75) Inventors: John Christopher Phelan, Duluth, GA (US); Yongxing Qiu, Duluth, GA (US); Robert Scott, Alpharetta, GA (US); Lynn Cook Winterton, Alpharetta, GA (US)

(73) Assignee: Novartis AG, Basel (CH)

( * ) Notice: Subject to any disclaimer, the term of this patent is extended or adjusted under 35 U.S.C. 154(b) by 94 days.

(21) Appl. No.: 12/616,166

(22) Filed: Nov. 11, 2009

(65) Prior Publication Data

US 2010/0120938 A1    May 13, 2010

Related U.S. Application Data

(60) Provisional application No. 61/114,216, filed on Nov. 13, 2008.

(51) Int. Cl.
*C08G 77/442* (2006.01)
(52) U.S. Cl. ............ 525/479; 528/25; 528/28; 526/258; 526/263; 526/303.1; 526/319; 526/323.1
(58) Field of Classification Search ........................ None
See application file for complete search history.

(56) References Cited

U.S. PATENT DOCUMENTS

| | | |
|---|---|---|
| 4,042,552 A | 8/1977 | Grucza |
| 4,045,547 A | 8/1977 | Le Boeuf |
| 4,312,575 A | 1/1982 | Peyman |
| 4,444,711 A | 4/1984 | Schad |
| 4,460,534 A | 7/1984 | Boehm |
| 4,632,844 A | 12/1986 | Yanagihara |
| 5,010,141 A | 4/1991 | Mueller |
| 5,034,461 A | 7/1991 | Lai |
| 5,079,319 A | 1/1992 | Mueller |
| 5,198,477 A | 3/1993 | von der Haegen |
| 5,219,965 A | 6/1993 | Valint |
| 5,227,432 A | 7/1993 | Jung |
| 5,244,981 A | 9/1993 | Seidner |
| 5,314,960 A | 5/1994 | Spinelli |
| 5,314,961 A | 5/1994 | Anton |
| 5,331,067 A | 7/1994 | Seidner |
| 5,358,995 A | 10/1994 | Lai |
| 5,387,632 A | 2/1995 | Lai |
| 5,416,132 A | 5/1995 | Yokoyama |
| 5,449,729 A | 9/1995 | Lai |
| 5,512,205 A | 4/1996 | Lai |
| 5,527,925 A | 6/1996 | Chabrecek |
| 5,760,100 A | 6/1998 | Nicolson |
| 5,843,346 A | 12/1998 | Morrill |
| 5,849,811 A | 12/1998 | Nicolson |
| 5,894,002 A | 4/1999 | Boneberger |
| 5,959,117 A | 9/1999 | Ozark |
| 5,981,615 A | 11/1999 | Meijs |
| 5,981,669 A | 11/1999 | Valint, Jr. |
| 5,981,675 A | 11/1999 | Valint, Jr. |
| 6,039,913 A | 3/2000 | Hirt |
| 6,204,306 B1 | 3/2001 | Chabrecek |
| 6,312,706 B1 | 11/2001 | Lai |
| 6,367,929 B1 | 4/2002 | Maiden |
| 6,451,871 B1 | 9/2002 | Winterton |
| 6,596,294 B2 | 7/2003 | Lai |
| 6,627,124 B1 | 9/2003 | Herbrechtsmeier |
| 6,638,991 B2 | 10/2003 | Baba |
| 6,719,929 B2 | 4/2004 | Winterton |
| 6,762,264 B2 | 7/2004 | Künzler |
| 6,793,973 B2 | 9/2004 | Winterton |
| 6,811,804 B2 | 11/2004 | Patel |
| 6,822,016 B2 | 11/2004 | McCabe |
| 6,852,353 B2 | 2/2005 | Qiu |
| 6,858,218 B2 | 2/2005 | Lai |
| 6,896,926 B2 | 5/2005 | Qiu |
| 7,040,756 B2 | 5/2006 | Qiu |
| 7,078,074 B2 | 7/2006 | Matsuzawa |
| 7,091,283 B2 | 8/2006 | Müller |
| 7,214,809 B2 | 5/2007 | Zanini |
| 7,247,692 B2 * | 7/2007 | Laredo ............................ 526/279 |
| 7,268,189 B2 * | 9/2007 | Muller et al. .................. 525/292 |
| 7,279,507 B2 | 10/2007 | Hu |
| 2001/0037001 A1 | 11/2001 | Müller |
| 2002/0198280 A1 | 12/2002 | Baba |
| 2005/0237483 A1 | 10/2005 | Phelan |
| 2008/0015315 A1 | 1/2008 | Chang |
| 2008/0143003 A1 | 6/2008 | Phelan |
| 2008/0143958 A1 | 6/2008 | Medina |
| 2008/0174035 A1 | 7/2008 | Winterton |
| 2008/0231798 A1 | 9/2008 | Zhou |
| 2008/0234457 A1 | 9/2008 | Zhou |
| 2009/0087399 A1 * | 4/2009 | Kuppert et al. ............. 424/70.12 |
| 2009/0162763 A1 * | 6/2009 | Li et al. ....................... 430/58.2 |

FOREIGN PATENT DOCUMENTS

| | | | |
|---|---|---|---|
| JP | 7-179795 | * | 7/1995 |
| JP | 2004-307539 | * | 11/2004 |

OTHER PUBLICATIONS

"Synthesis and Properties of Polydimethylsiloxane-Containing Block Copolymers via Living Free Radical Polymerization" authored by Huan et al. and published in Journal of Polymer Science, Part A: Polymer Chemistry (2001) 39, 1833-1842.*

(Continued)

*Primary Examiner* — Marc Zimmer
(74) *Attorney, Agent, or Firm* — Jian Zhou

(57) ABSTRACT

The invention provides an actinically-crosslinkable linear polysiloxane copolymer. The actinically-crosslinkable polysiloxane copolymer can be used to prepare a silicone hydrogel contact lens having a hydrophilic surface without post-curing surface treatment. The invention is also related to a silicone hydrogel contact lens obtained from a lens-forming material including an actinically-crosslinkable polysiloxane copolymer of the invention and to a method for making an actinically-crosslinkable polysiloxane copolymer of the invention. In addition, the invention provides a non-crosslinkable linear polysiloxane copolymer capable of being used as a internal wetting agent which can render the surface of a silicone hydrogel contact lens hydrophilic.

17 Claims, No Drawings

OTHER PUBLICATIONS

"Synthesis and Solution Properties of Dimethylsiloxane-2-(Dimethylamino)ethyl Methacrylate Block Copolymers" authored by Paz Banez et al. and published in Macromolecules (2000) 33, 451-456.*
Abstract for 07-179795 (Jul. 1995).*
Abstract for JP 2004-307539 (Nov. 2004).*

PCT International Search Report dated Apr. 26, 2010 for International Application No. PCT/US2009/063944, International Filing Date Nov. 11, 2009.
PCT Written Opinion of the International Searching Authority dated Apr. 26, 2010 for International Application No. PCT/US2009/063944, International Filing Date Nov. 11, 2009.

* cited by examiner

POLYSILOXANE COPOLYMERS WITH TERMINAL HYDROPHILIC POLYMER CHAINS

This application claims the benefit under 35 U.S.C. §119 (e) of U.S. provisional application Ser. No. 61/114,216 filed on Nov. 13, 2008, herein incorporated by reference in its entirety.

The present invention is related to a new class of polysiloxane copolymers with one or two terminal hydrophilic polymer chains. The present invention is also related to silicone hydrogel contact lenses prepared from a lens formulation containing a polysiloxane copolymer of the invention as an internal wetting agent.

BACKGROUND OF THE INVENTION

In recent years, soft silicone hydrogel contact lenses, for example, Focus NIGHT & DAY® and O2OPTIX™ (CIBA VISION), and PureVision® (Bausch & Lomb), Acuvue® Advance™ and Acuvue® Oasys™ become more and more popular because of their high oxygen permeability and comfort. "Soft" contact lenses conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen permeate through the lens to the cornea and to have minimal adverse effects on corneal health. However, a silicone hydrogel material typically has a surface or at least some areas of its surface which is hydrophobic (non-wettable). Hydrophobic surface or surface areas will up take lipids or proteins from the ocular environment and may adhere to the eye. Thus, a silicone hydrogel contact lens will generally require a surface modification.

In order to modify the surface hydrophilicity of contact lenses, contact lenses can be subject to surface treatment prior to cast-molding, for example, by incorporating wetting agents into a lens formulation for making the contact lenses as proposed in U.S. Pat. Nos. 4,045,547, 4,042,552, 5,198,477, 5,219,965, 6,367,929 and 6,822,016, 7,279,507. This type of method may be cost effective because after cast-molding of contact lenses there is no additional posterior surface treatment process required for modifying the surface hydrophilicity of the lens. However, the wetting agents are hydrophilic in nature and have very poor miscibility with some polymerizable hydrophobic components in silicone hydrogel lens formulation. One or more suitable compatibilizing agents must be used to render the wetting agents adequately (but still not completely) miscible with silicone hydrogel lens formulations. Choice for such compatibilizing agents is limited. Without compatibilizing agent, poor miscibility of a wetting agent with a silicone hydrogel lens formulation can cause the turbidity of the lens formulation and adversely affect the optical properties of resultant silicone hydrogel contact lenses.

Therefore, there exists a need for a method of making silicone hydrogel contact lenses having internal wetting agents and for a method of incorporating internal wetting agents into silicone hydrogel contact lenses.

SUMMARY OF THE INVENTION

The present invention, in one aspect, provides an actinically-crosslinkable linear polysiloxane copolymer comprising at least one linear polysiloxane segment end-capped at one of the two ends of the polysiloxane segment with a hydrophilic polymer chain through a linkage and at least one ethylenically unsaturated group covalently linked to the linkage.

The present invention, in another aspect, provides a silicone hydrogel contact lens. The silicone hydrogel contact lens of the invention comprises: a silicone hydrogel material and dangling hydrophilic polymer chains which are covalently anchored to the polymer matrix of the silicone hydrogel material, wherein the silicone hydrogel material is obtained by polymerizing a lens-forming material including an actinically-crosslinkable polysiloxane copolymer of the invention, wherein the dangling hydrophilic polymer chains are derived from the actinically-crosslinkable polysiloxane copolymer, wherein the dangling hydrophilic polymer chains in the silicone hydrogel material is capable of imparting the silicone hydrogel contact lens a hydrophilic surface without post-curing surface treatment.

The present invention, in a further aspect, provides a method for an actinically-crosslinkable polysiloxane copolymer of the invention, the method comprising the steps of: (a) mixing at least one hydrophilic vinylic monomer with a radical-generating polysiloxane having at least one phenone moiety and at least one first functional group to form polymerizable composition; (b) UV-irradiating the composition to form a chain-extended polysiloxane copolymer having the first functional group and at least one hydrophilic polymer chain extending from a portion of the phenone moiety attached to the polysiloxane copolymer; and (c) covalently attaching an ethylenically unsaturated group to the chain-extended polysiloxane copolymer by reacting it with an ethylenically-functionalizing vinylic monomer having a second function group which is co-reactive with the first functional group.

The present invention, in a still further aspect, provides a copolymer having a polysiloxane segment end-capped at each end with one hydrophilic polymer chain, which is useful as an internal wetting agent for making silicone hydrogel contact lenses with hydrophilic surfaces without post-curing surface treatment.

This and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "vinylic monomer" means a low molecular weight compound having one ethylenically unsaturated group. Low molecular weight typically means average molecular weights less than 700 Daltons.

A "silicone-containing vinylic monomer" refers to a vinylic monomer which contains silicone.

The term "olefinically unsaturated group" or "ethylenically unsaturated group" is employed herein in a broad sense and is intended to encompass any groups containing a >C=C< group. Exemplary ethylenically unsaturated groups include without limitation acryloyl, methacryloyl, allyl, vinyl, styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

The term "fluid" as used herein indicates that a material is capable of flowing like a liquid.

A "hydrophilic vinylic monomer" refers to a vinylic monomer which can be polymerized actinically to form a polymer that is water-soluble or can absorb at least 10 percent by weight of water.

A "hydrophobic vinylic monomer" refers to a vinylic monomer which can be polymerized actinically to form a polymer that is insoluble in water and can absorb less than 10 percent by weight water.

A "macromer" refers to a medium and high molecular weight compound which can be polymerized and/or crosslinked actinically. Medium and high molecular weight typically means average molecular weights greater than 700 Daltons. In accordance with the invention, a macromer can be a macromer with one or more ethylenically unsaturated groups. A "siloxane-containing macromer" is a macromer which contains silicone and can be crosslinked actinically.

A "prepolymer" refers to a starting polymer which contains multiple actinically crosslinkable groups and can be cured (e.g., crosslinked) actinically to obtain a crosslinked polymer having a molecular weight much higher than the starting polymer.

A "silicone-containing prepolymer" refers to a prepolymer which contains silicone and can be crosslinked actinically to obtain a crosslinked polymer having a molecular weight much higher than the starting polymer.

"Molecular weight" of a polymeric material (including monomeric or macromeric materials), as used herein, refers to the number-average molecular weight unless otherwise specifically noted or unless testing conditions indicate otherwise.

"Polymer" means a material formed by polymerizing one or more monomers.

As used herein, the term "multiple" refers to at least two, preferably at least three.

The term "dangling" in reference to a hydrophilic polymer chain or a polysiloxane polymer chain in a polymer is intended to describe that the polymer chain which is anchored to the main chain of the polymer through one single covalent linkage (preferably at one of the ends of the polymer chain).

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocur® types, and Irgacur® types, preferably Darocur® 1173, and Irgacur® 2959.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. For example, a spatial limitation of UV radiation can be achieved by using a mask or screen that has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region. The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a solvent and that is used to impart color. Dyes are typically translucent and absorb but do not scatter light. Any suitable biocompatible dye can be used in the present invention.

A "Pigment" means a powdered substance that is suspended in a liquid in which it is insoluble. A pigment can be a fluorescent pigment, phosphorescent pigment, pearlescent pigment, or conventional pigment. While any suitable pigment may be employed, it is presently preferred that the pigment be heat resistant, non-toxic and insoluble in aqueous solutions.

"Surface modification", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, plasma processes in which an ionized gas is applied to the surface of an article (see, for example, U.S. Pat. Nos. 4,312,575 and 4,632,844 herein incorporated by reference in its entirety); a surface treatment by energy other than plasma (e.g., a static electrical charge, irradiation, or other energy source); chemical treatments; the grafting of hydrophilic monomers or macromers onto the surface of an article; mold-transfer coating process disclosed in U.S. Pat. No. 6,719,929 (herein incorporated by reference in its entirety); the incorporation of wetting agents into a lens formulation for making contact lenses (i.e., surface treatment prior to polymerization) proposed in U.S. Pat. Nos. 4,045,547, 4,042,552, 5,198,477, 5,219,965, 6,367,929 and 6,822,016, 7,279,507 (herein incorporated by references in their entireties); reinforced mold-transfer coating disclosed in PCT Patent Application Publication No. WO2007/146137 (herein incorporated by reference in its entirety); and layer-by-layer coating ("LbL coating") obtained according to methods described in U.S. Pat. No. 6,451,871, 6,719,929, 6,793,973, 6,811,805, 6,896,926 (herein incorporated by references in their entireties).

"Post-curing surface treatment", in reference to a silicone hydrogel material or a soft contact lens, means a surface treatment process that is performed after the formation (curing) of the hydrogel material or the soft contact lens in a mold.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (advancing angle measured by sessile drop method), which is obtained by averaging measurements of at least 3 individual contact lenses.

An "antimicrobial agent", as used herein, refers to a chemical that is capable of decreasing or eliminating or inhibiting the growth of microorganisms such as that term is known in the art.

"Antimicrobial metals" are metals whose ions have an antimicrobial effect and which are biocompatible. Preferred antimicrobial metals include Ag, Au, Pt, Pd, Ir, Sn, Cu, Sb, Bi and Zn, with Ag being most preferred.

"Antimicrobial metal-containing nanoparticles" refer to particles having a size of less than 1 micrometer and containing at least one antimicrobial metal present in one or more of its oxidation states.

"Antimicrobial metal nanoparticles" refer to particles which are made essentially of an antimicrobial metal and have a size of less than 1 micrometer. The antimicrobial metal in the antimicrobial metal nanoparticles can be present in one or more of its oxidation states. For example, silver-containing nanoparticles can contain silver in one or more of its oxidation states, such as $Ag^0$, $Ag^{1+}$, and $Ag^{2+}$.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$(cm^3\ oxygen)/(cm^2)(sec)(mm\ Hg)]\times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$(cm^3\ oxygen)(mm)/(cm^2)(sec)(mm\ Hg)]\times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm (oxygen transmissibility barrers/mm). In accordance with the invention, a high oxygen permeability in reference to a material or a contact lens characterized by apparent oxygen permeability of at least 40 barrers or larger measured with a sample (film or lens) of 100 microns in thickness.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D=-n'/(A\times dc/dx)$$

where n'=rate of ion transport [mol/min]
A=area of lens exposed [$mm^2$]
D=Ionoflux Diffusion Coefficient [$mm^2$/min]
dc=concentration difference [mol/L]
dx=thickness of lens [mm]

The Ionoton Ion Permeability Coefficient, P, is then determined in accordance with the following equation:

$$\ln(1-2C(t)/C(0))=-2APt/Vd$$

where: C(t)=concentration of sodium ions at time t in the receiving cell
C(0)=initial concentration of sodium ions in donor cell
A=membrane area, i.e., lens area exposed to cells
V=volume of cell compartment (3.0 ml)
d=average lens thickness in the area exposed
P=permeability coefficient An Ionoflux Diffusion Coefficient, D, of greater than about $1.5\times 10^{-6}$ $mm^2$/min is preferred, while greater than about $2.6\times 10^{-6}$ $mm^2$/min is more preferred and greater than about $6.4\times 10^{-6}$ $mm^2$/min is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

In general, the invention is directed to a class of actinically crosslinkable polysiloxane with one or two dangling hydrophilic polymer chains. Such prepolymers can be used to prepare silicone hydrogel contact lenses. It is known that a silicone hydrogel material typically has a surface or at least some areas of its surface, which is hydrophobic (non-wettable). Hydrophobic surface or surface areas will up-take lipids or proteins from the ocular environment and may adhere to the eye. Thus, a silicone hydrogel contact lens will generally require a surface modification which is typically carried out after cast-molding of the lens.

However, actinically crosslinkable polysiloxane copolymer of the invention can be used to as internal wetting agent in preparing silicon hydrogel contact lenses with a high oxygen permeability and a hydrophilic surface without post-curing surface treatment. It is believed that when a liquid lens forming material including an actinically crosslinkable polysiloxane of the invention is introduced in a mold for making contact lenses, the dangling hydrophilic polymer chains of the polysiloxane is preferably adsorbed at the interface between the mold and the lens forming material. Where the dangling hydrophilic polymer chains are present in an amount sufficient, an interfacial films, which is composed essentially of dangling hydrophilic polymer chains and has adequate thickness, can be formed at the mold-liquid interface prior to curing (polymerization) and subsequently preserved after curing. It is also believed that because the crosslinking sites being located at the end(s) of polysiloxane segment and lack of crosslinking sites in the hydrophilic chains, the migration of polysiloxane is restricted by crosslinkers while the hydrophilic chains may migrate out of the lens surface. As such, one can make a silicone hydrogel contact lens with a hydrophilic interfacial film thereon without any post curing surface treatment.

There are several potential unique features associated with use of actinically crosslinkable polysiloxane a copolymer of the invention in making silicone hydrogel contact lens. First, an actinically crosslinkable polysiloxane copolymer of the invention is compatible with both hydrophobic or hydrophilic components in a silicone hydrogel lens forming material. There is no need for any compatibilizing agent. Second, unlike a hydrophilic polymer as an internal wetting agent, an actinically crosslinkable polysiloxane copolymer of the invention not only can function as internal wetting agent to render the surfaces of resultant silicone hydrogel lenses hydrophilic because of the presence of dangling hydrophilic polymer chains, but also can enhance the oxygen permeability of the resultant lenses because of the presence of polysiloxane segment. Third, the internal wetting agent is covalently attached to the polymer matrix of a resultant silicone hydrogel lens and cannot be removed during extraction and/or hydration process. Fourth, it is believed that because of amphiphilic nature of a polysiloxane copolymer of the invention, it may facilitate the microscopic phase separation of a resultant silicone hydrogel material into a silicone-rich microscopic phase and a hydrophilic microscopic phase. With the existence of a co-continuous bi-phase structure (in microscopic scale), the silicone hydrogel material can have relatively high oxygen and ion permeabilities.

The present invention, in one aspect, provides an actinically-crosslinkable linear polysiloxane copolymer comprising at least one linear polysiloxane segment end-capped at least at one of the two ends of the polysiloxane segment with one hydrophilic polymer chain through a linkage and at least one ethylenically unsaturated group covalently linked to the linkage, wherein the hydrophilic chains is composed of one or more monomer units selected from the group consisting of units of N-vinyl-2-pyrrolidone (NVP), N,N-dimethylacrylamide (DMA), dimethylaminoethyl methacrylate, dimethylaminoethyl acrylate, vinyl alcohol, dimethylaminoethylmethacrylamide, a $C_1$-$C_4$-alkoxy polyethylene glycol (meth) acrylate having a weight average molecular weight of from 200 to 1500, N-vinyl-N-methyl isopropylamide, N-vinyl-N-methyl acetamide, and mixtures thereof.

If desired, the wetting properties or hydrophilicity of the hydrophilic chains can be modulated through copolymerization of hydrophilic monomers with hydrophobic or amphiphilic monomers during chain extension of PDMS. For example one decrease hydrophilicity of by allowing hydrophilic monomers such as DMA, NVP, or N-vinyl-methyl acetamide to copolymerize with monomers such as MMA, EOEMA, or cyclohexylmethyl methacrylated during chain extension of PDMS. The wetting properties of the hydrophilic chains could also be modulated by altering the end groups. This might be accomplished by incorporation of chain transfer agents during chain extension of PDMS. For example, one might chain extend PDMS with DMA in the presence of chain transfer agents. Possible chain transfer units include carbon tetrachloride, carbon tetrabromide, bromotrichloromethane, thiols such as isooctyl-3-mercaptopropionate, 3-mercaptoproprionic acide, 6-mercaptohexanoic acid, 15-mercaptopentadecanoic acid, 11-mercaptoundecanoic acid, mercaptopolyethyleneglycolmonomethylether, thiophenol, 4-methylbenzenethiol, O[2-(3-mercaptopropionylamino)ethyl]-O'methylpolyethylene glycol, tert-nonylmercaptan, methane thiol, ethane thiol, propane thiol, butane thiol, pentane thiol, dodecane thiol and the like.

In accordance with the invention, the term "derived from" in reference to polymeric units in the polymer chain means that the polymeric units are obtained from a specified monomer in a polymerization reaction.

In accordance with the invention, an actinically-crosslinkable linear polysiloxane copolymer is defined by formula (I)

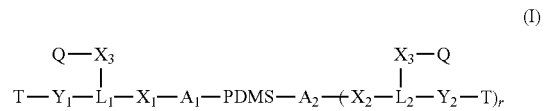

in which r is an integer of 0 or 1;

$A_1$ and $A_2$ independent of each other is a linear or branched $C_1$-$C_{10}$ alkylene divalent radical;

$X_1$, $X_2$ and $X_3$ independent of each other are a linkage selected from the group consisting of a direct bond,

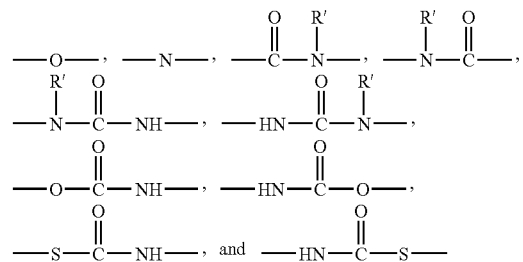

in which R' is H or $C_1$-$C_8$ alkyl;

$L_1$ and $L_2$ independent of each other are

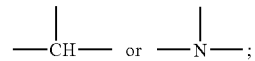

PDMS is a polysiloxane divalent radical of formula (II)

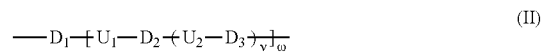

in which v is 0 or 1, ω is an integer of from 0 to 5, $U_1$ and $U_2$ independent of each other represent a divalent radical of —$R_1$—$X_4$-E-$X_5$—$R_2$— in which $R_1$ and $R_2$ independent of each other is a linear or branched $C_1$-$C_{10}$ alkylene divalent radical, $X_4$ and $X_5$ independent of each other are a linkage selected from the group consisting of

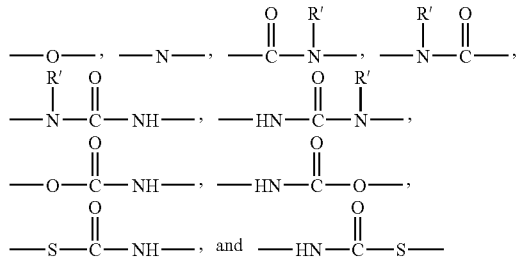

in which R' is H or $C_1$-$C_8$ alkyl, E is an alkyl diradical, a cycloalkyl diradical, an alkylcycloalkyl diradical, an alkylaryl diradical, or an aryl diradical with 1 to 40 carbon atoms which may have ether, thio, or amine linkages in the main chain, $D_1$, $D_2$ and $D_3$ independently of each other represent a divalent group of formula (III)

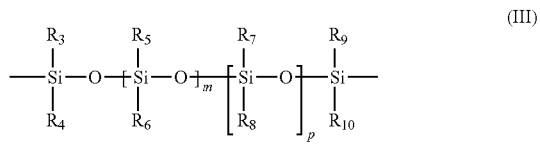

in which $R_3$, $R_4$, $R_5'$, $R_6$, $R_7$, $R_8$, $R_9$ and $R_{10}$, independently of one another, are $C_1$-$C_8$-alkyl, $C_1$-$C_4$ alkyl- or $C_1$-$C_4$-alkoxy-substituted phenyl, fluoro($C_1$-$C_{10}$-alkyl), cyano($C_1$-$C_{12}$-alkyl), alk-$(OCH_2CH_2)_n$—$OR_{11}$ in which alk is $C_1$-$C_6$-alkylene divalent radical, $R_{11}$ is $C_1$-$C_6$ alkyl and n is an integer from 1 to 10, m and p independently of each other are an integer of from 2 to 698 and (m+p) is from 5 to 700;

$Y_1$ and $Y_2$ independent of each other represent a divalent radical of formula (IV) or (V)

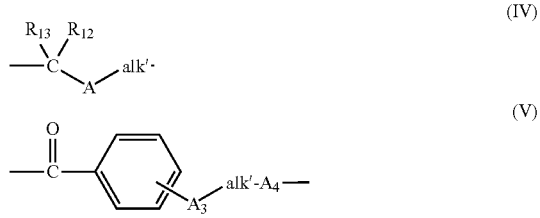

in which $R_{12}$ and $R_{13}$ independent of each other are hydrogen, $C_1$-$C_8$ alkyl, $C_1$-$C_8$ cycloalkyl, or $C_1$-$C_8$ aryl, or $R_1$ and $R_2$ together are —$(CH_2)_q$— where g is an integer from 2 to 6, alk' is a linear or branched $C_1$-$C_{10}$ alkylene divalent radical, A and $A_4$ independent of each other —O—, —NR'—, or —S—;

$A_3$ is a linkage selected from the group consisting of

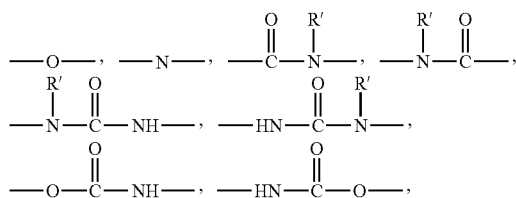

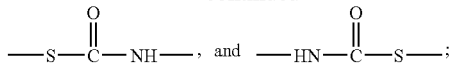

Q is an organic radical containing an ethylenically unsaturated group; and

T is a monovalent hydrophilic polymer chain composed of monomer units from one or more hydrophilic vinylic monomers selected from the group consisting of N-vinyl-2-pyrrolidone (NVP), N,N-dimethylacrylamide (DMA), dimethylaminoethyl methacrylate, dimethylaminoethyl acrylate, dimethylaminoethylmethacrylamide, a $C_1$-$C_4$-alkoxy polyethylene glycol (meth)acrylate having a weight average molecular weight of from 200 to 1500, N-vinyl-N-methyl isopropylamide, N-vinyl-N-methyl acetamide, and vinyl alcohol.

Preferably, Q is an ethylenically unsaturated group of formula (VI)

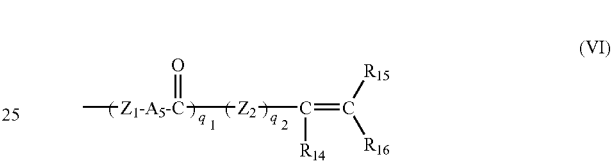

in which $Z_1$ and $Z_2$ independent of each other are a linear or branched $C_1$-$C_{12}$ alkylene divalent radical, unsubstituted phenylene divalent radical, $C_1$-$C_4$ alkyl or $C_1$-$C_4$ alkoxy substituted phenylene divalent radical or $C_7$-$C_{12}$ aralkylene divalent radical; $A_5$ is —O— or —NH—; $q_1$ and $q_2$ independent of each other are an integer of 0 or 1; $R_{14}$ is hydrogen, $C_1$-$C_4$ alkyl or halogen; $R_{15}$ and $R_{16}$ independent of each other are hydrogen, $C_1$-$C_4$ alkyl, phenyl, carboxy or halogen.

As an illustrative example, an actinically-crosslinkable linear polysiloxane copolymer of the invention can be prepared in a multiple-step process as follows.

In the first step, one or more phenone groups are covalently attached to a polysiloxane through its terminal functional group(s) (e.g., amino, epoxy, chloroalkyl, bromoalkyl, or hydroxyl group) based on a known coupling reaction between a pair of co-reactive function groups, to obtain a radical-generating polysiloxane with terminal phenone group(s).

It is well known in the art that a pair of matching reactive groups can form a covalent bond or linkage under known coupling reaction conditions, such as, oxidation-reduction conditions, dehydration condensation conditions, addition conditions, substitution (or displacement) conditions, Diels-Alder reaction conditions, cationic crosslinking conditions, and epoxy hardening conditions. For example, an amino group reacts with aldehyde group to form a Schiff base which may further be reduced; an amino group reacts with an acid chloride to form an amide linkage (—CO—N—); an amino group reacts with an isocyanate to form a urea linkage, an amino group reacts with an epoxy group to form an amine linkage (—NH— or —NR'— or —NR2-, i.e. tetra-alkyl ammonium); an hydroxyl reacts with an isocyanate to form a urethane linkage; an hydroxyl reacts with an epoxy to form an ether linkage (—O—); a hydroxyl reacts with an acid chloride to form an ester linkage; a hydroxy group reacts with an isocyanate to form a urethane linkage; and a chloroalkyl or bromoalkyl group can react with a primary amino group (—$NH_2$—) to form a secondary amine linkage (NH). Chloroalkyl or bromoalkyl group can react with a secondary amino group (—NH—) to form a tertiary amine linkage (—NR—). Similarly, chloroalkyl or bromoalkyl group can react with a tertiary amino group (—NR—) to form quaternary ammonium (—N⁺RR'—) linkage.

Exemplary covalent bonds or linkage, which are formed between pairs of crosslinkable groups, include without limitation, ester, ether, acetal, ketal, vinyl ether, carbamate, urea, urethane, amine, amide, enamine, imine, oxime, amidine, iminoester, carbonate, orthoester, phosphonate, phosphinate, sulfonate, sulfinate, sulfide, sulfate, disulfide, sulfinamide, sulfonamide, thioester, aryl, silane, siloxane, heterocycles, thiocarbonate, thiocarbamate, and phosphonamide.

Exemplary reactive groups include hydroxyl group, amine group, amide group, anhydride group, sulfhydryl group, —COOR (R and R' are hydrogen or $C_1$ to $C_8$ alkyl groups), halide (chloride, bromide, iodide), acyl chloride, isothiocyanate, isocyanate, monochlorotriazine, dichlorotriazine, mono- or di-halogen substituted pyridine, mono- or di-halogen substituted diazine, phosphoramidite, maleimide, aziridine, sulfonyl halide, hydroxysuccinimide ester, hydroxysulfosuccinimide ester, imido ester, hydrazine, axidonitrophenyl group, azide, 3-(2-pyridyl dithio)proprionamide, glyoxal, aldehyde, epoxy.

It is understood that coupling agents may be used. For example, a carbodiimide can be used in the coupling of a carboxyl and an amine to form an amide linkage between the molecules being coupled. Examples of carbodiimides are 1-ethyl-3-(3-dimethylaminopropyl)carbodiimide (EDC), N,N'-dicyclohexylcarbodiimide (DCC), 1-cyclohexyl-3-(2-morpholinoethyl)carbodiimide, diisopropyl carbodiimide, or mixtures thereof. N-hydroxysuccinimide (NHS) or N-hydroxysulfosuccinimide may be desirably included in carbodiimide (e.g., EDC)-mediated coupling reaction to improve coupling (conjugation) efficiency. EDC couples NHS to carboxyls, resulting in an NHS-activated site on a molecule. The formed NHS-ester can react with amines to form amides.

Preferably, the functional groups involved in the coupling reactions for preparing radical-generating polysiloxanes with terminal phenone groups are selected from the group consisting of hydroxyl groups (—OH), primary amino groups (—NH₂), secondary amino groups (—NHR), carboxyl groups (—COOH), epoxy groups, aldehyde groups (—CHO), amide groups (—CONH₂), acid halide groups (—COX, X═Cl, Br, or I), isothiocyanate groups, isocyanate groups, halide groups (—X, X═Cl, Br, or I), acid anhydride groups, and combinations thereof.

Any phenone compound can be used in the preparation of a radical-generating polysiloxane with terminal phenone group(s), so long as the phenone compound contains a functional group, such as, amino, epoxy, chloroalkyl, bromoalkyl, or hydroxyl group. Examples of phenone compounds include, without limitation, hydroxycyclohexylphenylketone, 2-hydroxy-2-methyl-1-phenyl-1-propanone, 2-bromoisobutyrolphenone), 2-hydroxyacetophenone, 2-bromoacetophenone, 2-aminoacetophenone hydrochloride, 2-benzyl-2-N,N-dimethylamino-1-(4-morpholinophenyl)-1-butanone, 2-methyl-1-[4-(methylthio)phenyl]-2-morpholinopropanone.

Any polysiloxane with one or two amino, hydroxyl, epoxy, halogen (e.g., chloro, bromo) terminal groups can be used to prepare a polysiloxane with terminal phenone group(s). Examples of such polysiloxanes are commercially available, e.g., from Aldrich, ABCR GmbH & Co., Fluorochem, or Gelest, Inc, Morrisville, Pa. Such polysiloxanes can also be used to prepare a difunctionalized polysiloxane of formula (II) containing several polysiloxane segments connected with each other through a linkage according to procedures described in U.S. Pat. Nos. 5,034,461 and 5,416,132 (herein incorporated by references in their entireties).

In the second step for the preparation of chain-extended polysiloxane copolymer, the terminal phenone group(s) of radical-generating polysiloxane is served as photoinitiator for the free-radical chain-growth polymerization of one or more hydrophilic vinylic monomers. When irradiating with UV radiation a composition comprising a radical-generating polysiloxane having terminal phenone group(s) and one or more hydrophilic vinylic monomers and/or vinyl acetate, each phenone group is cleaved into two free radicals, one attached to the polysiloxane and the other cleaved off from the polysiloxane, each initiating free-radical chain-growth polymerization of one or more hydrophilic vinylic monomers and/or vinyl acetate in the composition. As such, a hydrophilic polymer chains can be formed which extends from a portion of the phenone group(s) which is still attached to the polysiloxane.

It should be understood that for preparing an actinically crosslinkable polysiloxane copolymer of the invention, a hydrophilic vinylic monomer should be free of functional group so as to avoid introducing more than two ethylenically unsaturated groups into the polysiloxane copolymer. It is believed that by keeping the hydrophilic polymer chains free of ethylenically unsaturated groups, they can still dangle freely even after they are copolymerized with other lens-forming materials to form a lens. Such dangling hydrophilic polymer chain may migrate to the lens surface to make the lens surface hydrophilic. To minimize the migration of polysiloxane segments, it is desirable that the actinically-crosslinking sites would be located in the polysiloxane segments or near their ends. However, with respect to a non-crosslinkable polysiloxane copolymer, any hydrophilic vinylic monomer can be used as described later.

Where T in formula (I) is a polymer chain including vinyl alcohol units, those vinyl alcohol units can be obtained by hydrolyzing vinyl acetate units after the ethylenically functionalizing step.

Where a $C_1$-$C_4$-alkoxy polyethylene glycol (meth)acrylate having a weight average molecular weight of from 200 to 1500 is used to prepare a chain-extended polysiloxane copolymer (step 2), the resultant polysiloxane copolymer of the invention can have a bottle-brush-type (i.e., a polymer main chain with short hydrophilic side chains) hydrophilic chain.

In the third step, the obtained chained-extended polysiloxane copolymer can be ethylenically functionalized, by reacting it with an ethylenically-functionalizing vinylic monomer having a functional group, such as, isocyanate, epoxy, acid chloride group or anhydride, which can react with the hydroxyl group or secondary amine linkage of the chain-extended polysiloxane copolymer, so as to obtain an actinically-crosslinkable polysiloxane copolymer of the invention. Any suitable vinylic monomers containing a functional group selected from the group consisting of isocyanate, epoxy, anhydride, and acid chloride group, can be used as an ethylenically unsaturated vinylic monomer in the invention.

Schemes 1-5 illustrate several examples of preparation of preferred actinically-crosslinkable polysiloxane copolymers of the invention based on the multiple-step process discussed above. It is understood that by replacing reactants in the schemes, one can prepare different polysiloxane copolymers of the invention. A person skilled in the art will understand well how to select catalysts, reagents, and reaction conditions as illustrated in Schemes 1-5.

Scheme 1
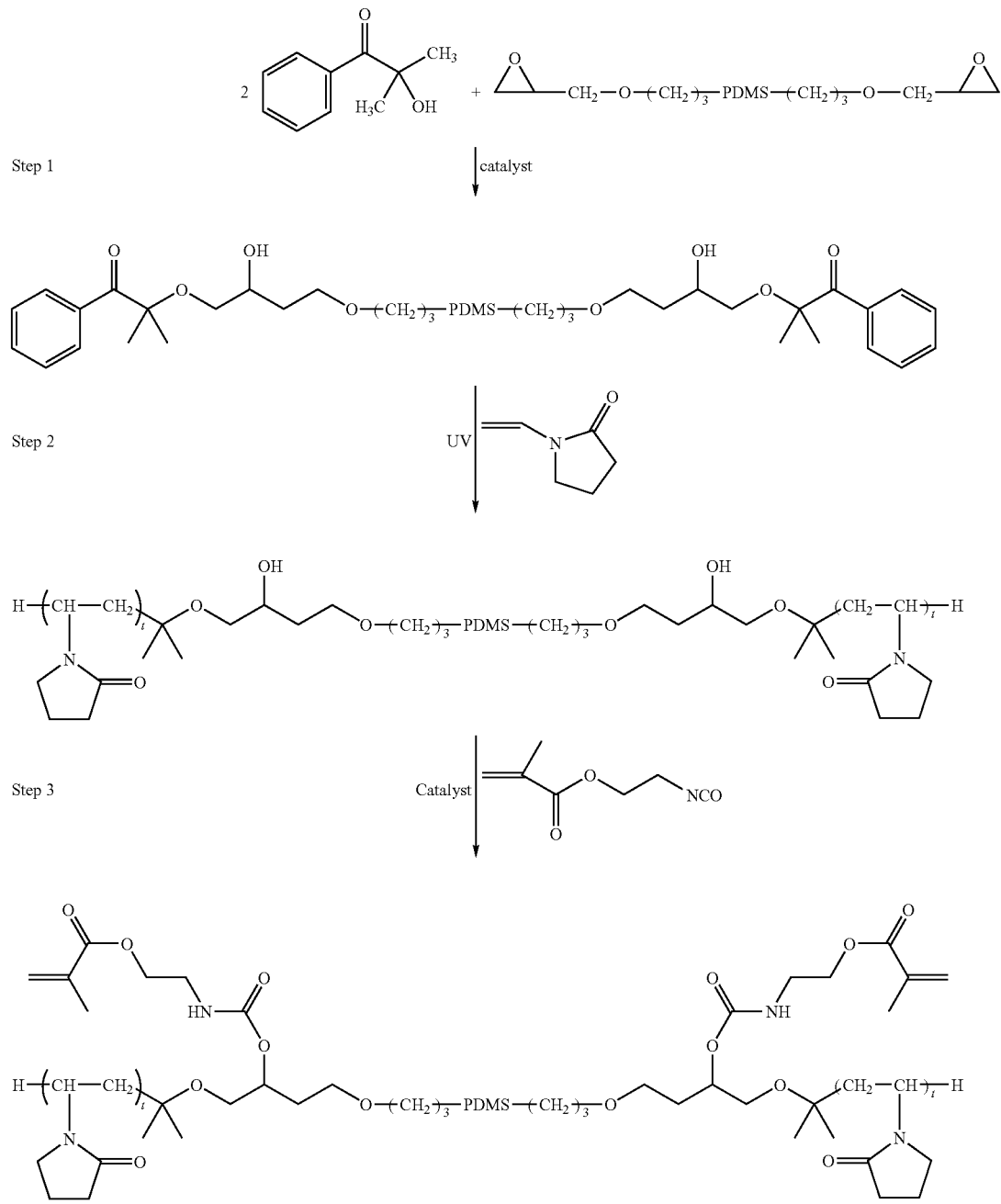
Scheme 2
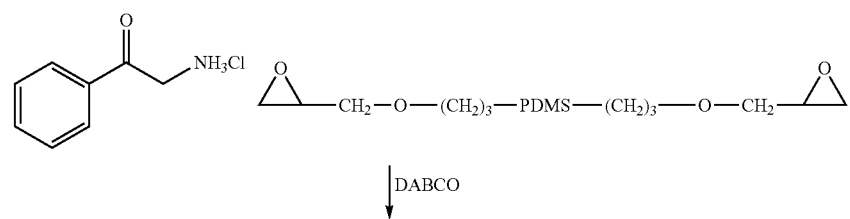

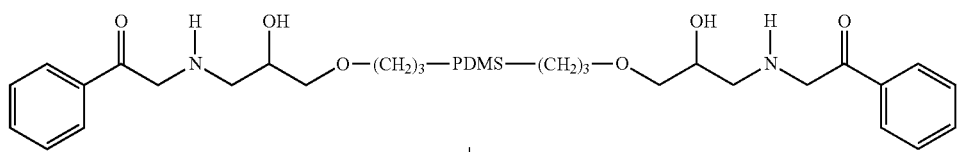
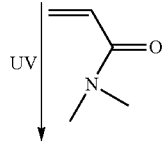
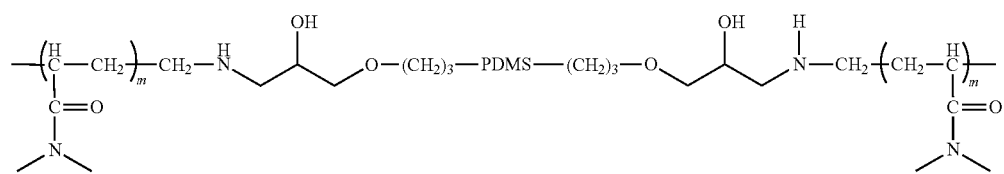
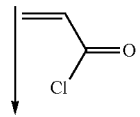
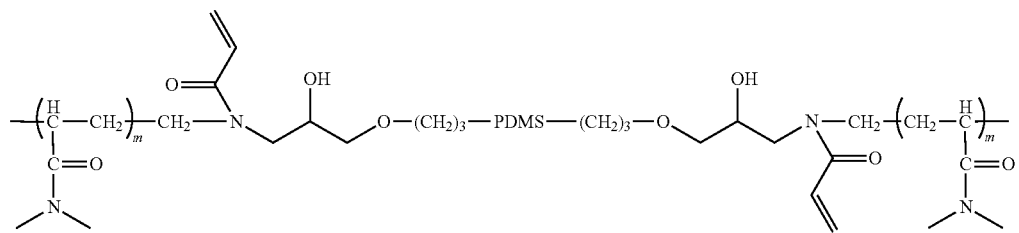
Scheme 3
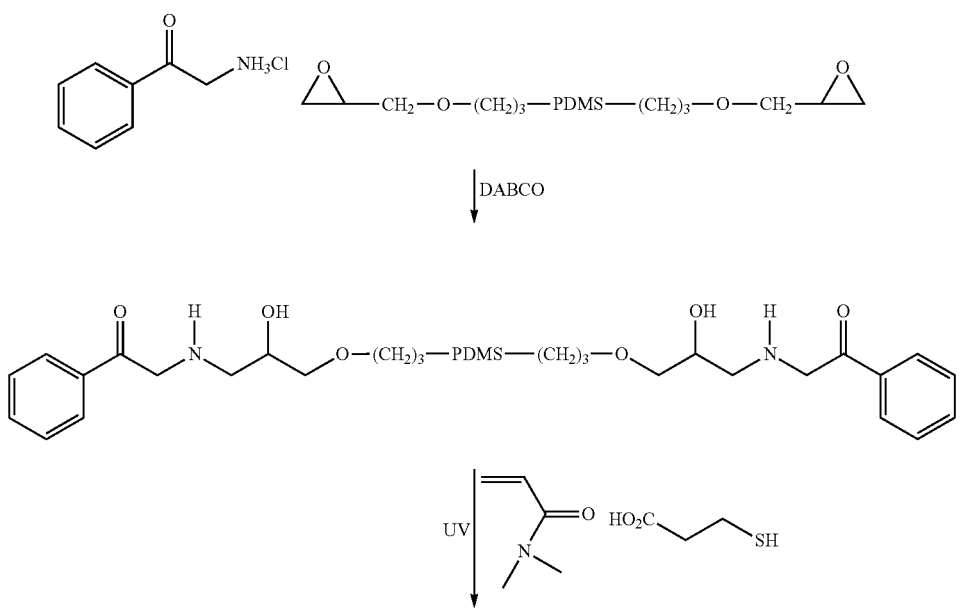

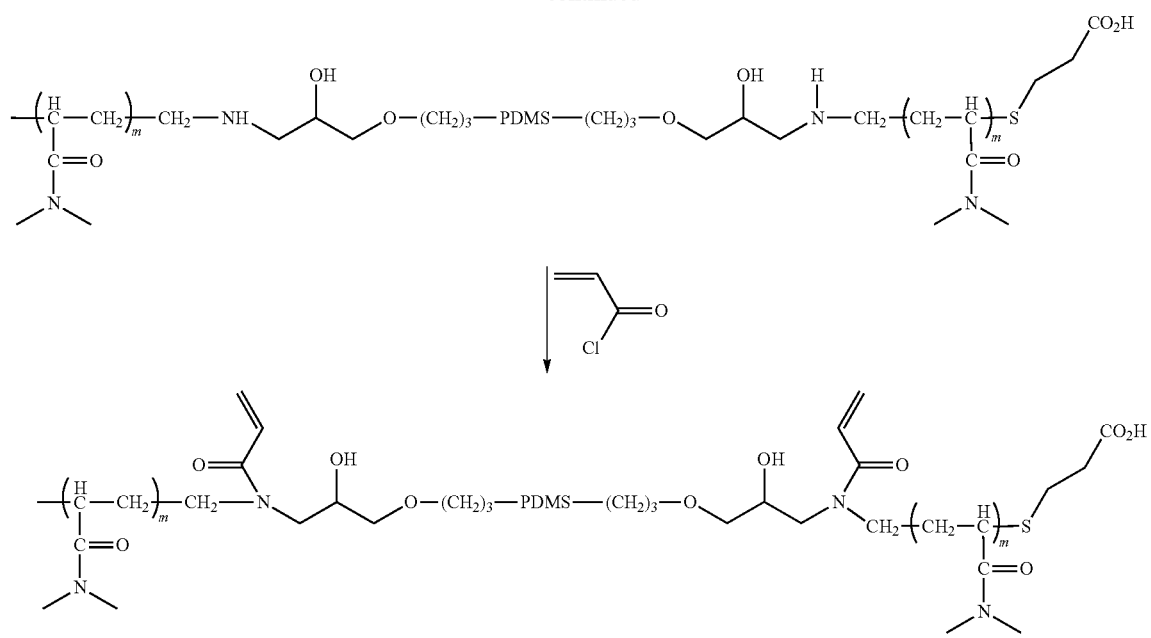
Scheme 4
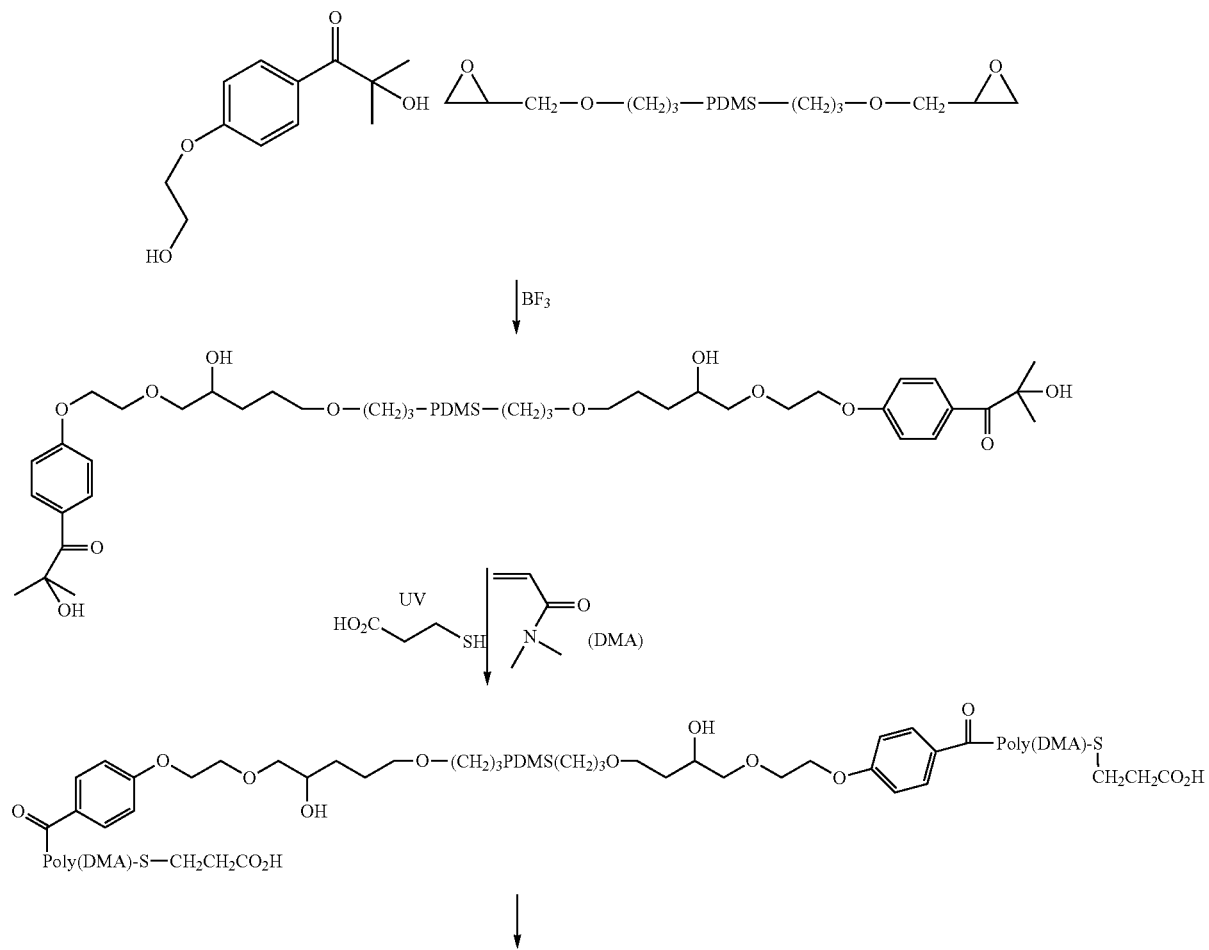

-continued
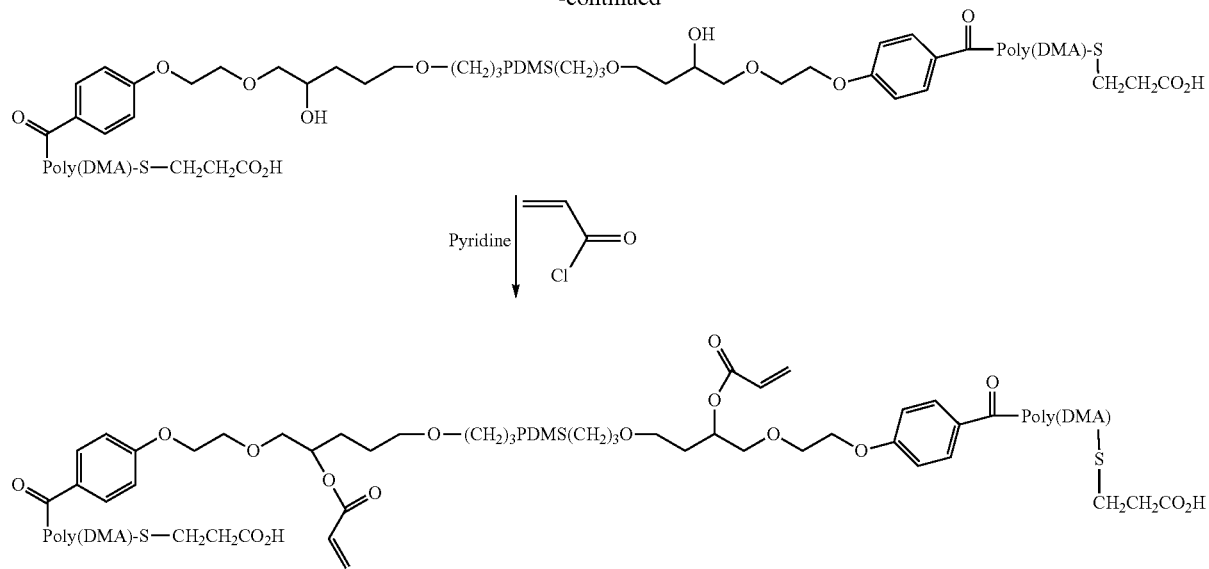
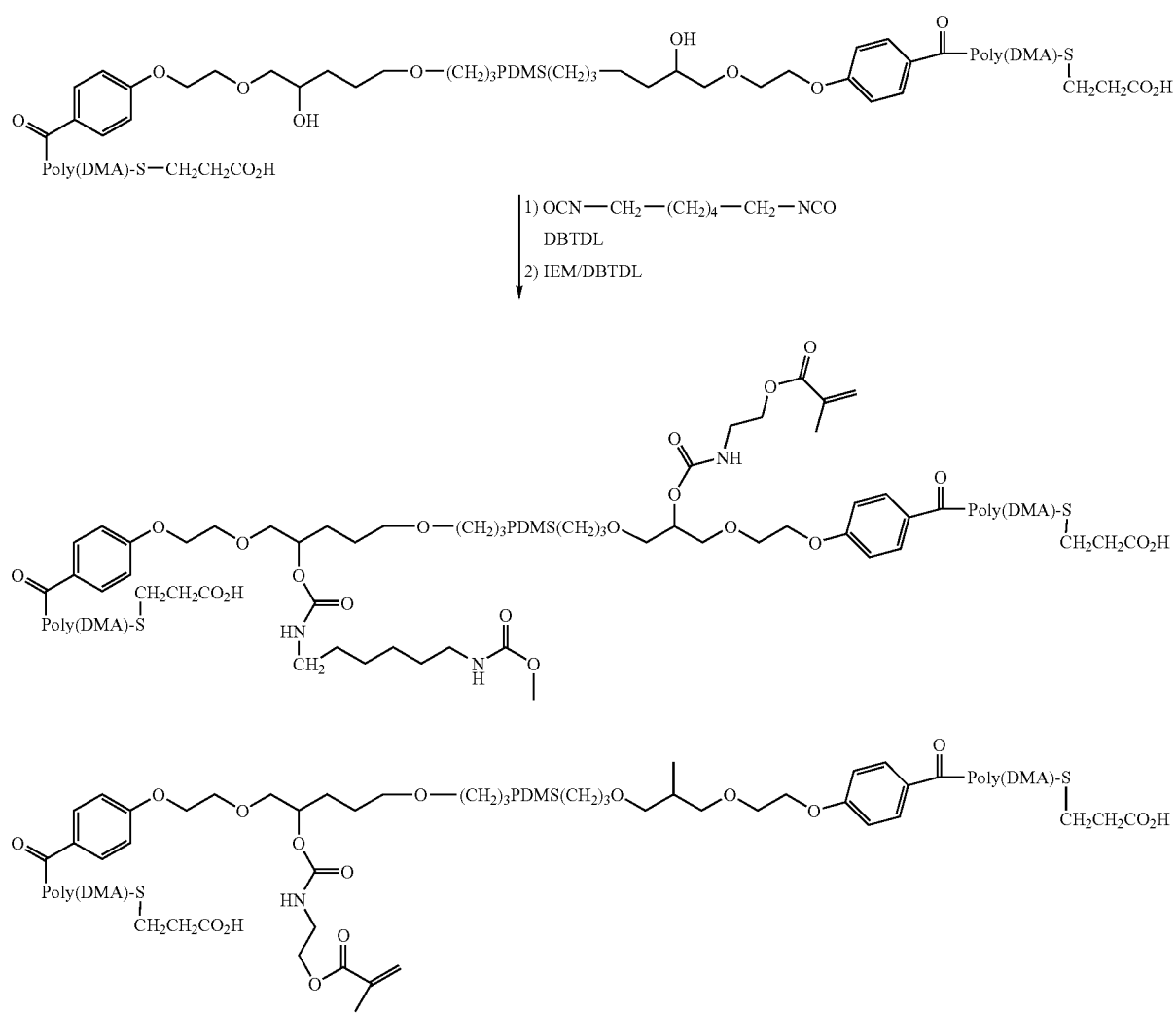
Scheme 5

An actinically-crosslinkable polysiloxane copolymer of the invention can find particular use in making silicone hydrogel materials and silicone-containing prepolymers.

The present invention, in another aspect, provides a silicone hydrogel contact lens. The silicone hydrogel contact lens of the invention comprises: a silicone hydrogel material and dangling hydrophilic polymer chains which are covalently anchored to the polymer matrix of the silicone hydrogel material, wherein the silicone hydrogel material is obtained by polymerizing a lens-forming material including an actinically-crosslinkable linear polysiloxane copolymer, wherein the actinically-crosslinkable linear polysiloxane copolymer comprises at least one linear polysiloxane segment end-capped at least at one of the two ends of the polysiloxane segment with a hydrophilic polymer chain through a linkage and at least one ethylenically unsaturated group covalently linked to the linkage, wherein the dangling hydrophilic polymer chains are derived from the actinically-crosslinkable polysiloxane copolymer, wherein the dangling hydrophilic polymer chains in the silicone hydrogel material is capable of imparting the silicone hydrogel contact lens a hydrophilic surface without post-curing surface treatment.

All of various embodiments of actinically-crosslinkable polysiloxane copolymers can be used in this aspect of the invention.

A "lens-forming material" refers to a polymerizable composition which can be cured (i.e., polymerized and/or crosslinked) thermally or actinically in a mold to obtain a contact lens. Lens-forming materials are well known to a person skilled in the art. In accordance with the invention, a lens-forming material can be prepared by adding an actinically-crosslinkable polysiloxane copolymer of the invention to any lens formulations for making soft contact lenses. Exemplary lens formulations include without limitation the formulations of lotrafilcon A, lotrafilcon B, etafilcon A, genifilcon A, lenefilcon A, polymacon, acquafilcon A, balafilcon, senofilcon A, and the like. Preferably, a silicone hydrogel lens-forming material used in the present invention comprises a silicone-containing vinylic monomer, macromer or prepolymer. A lens-forming material can further include other components, such as, one or more hydrophilic vinylic monomers, one or more hydrophobic vinylic monomers, one or more hydrophilic prepolymers, polymerization initiators (e.g., photoinitiator or thermal initiator), a visibility tinting agent (e.g., dyes, pigments, or mixtures thereof), UV-blocking (absorbing) agent, photosensitizers, inhibitors, antimicrobial agents (e.g., preferably silver nanoparticles), bioactive agent, leachable lubricants, fillers, and the like, as known to a person skilled in the art.

Any known suitable silicone-containing vinylic monomers or macromers or prepolymers with one or more ethylenically unsaturated groups can be used in the lens-forming material. Preferred examples of such monomers or macromers are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); dimethacrylated or diacrylated polydimethylsiloxanes of various molecular weight; vinyl terminated polydimethylsiloxanes; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane; polysiloxanylalkyl(meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing monomers or macromers; siloxane-containing macromers disclosed in U.S. Pat. No. 6,762,264 (here incorporated by reference in its entirety). Di and triblock macromers consisting of polydimethylsiloxane and polyalkyleneoxides could also be of utility. For example one might use methacrylate end capped polyethyleneoxide-block-polydimethylsiloxane-block-polyethyleneoxide to enhance oxygen permeability. Suitable monofunctional hydroxyl-functionalized siloxane-containing monomers and suitable multifunctional hydroxyl-functionalized siloxane-containing monomers are commercially available from Gelest, Inc, Morrisville, Pa.

Examples of silicone-containing prepolymers include without limitation those disclosed in US Patent Application Publication Nos. 2001/0037001 A1, US 2005/0237483 A1 and 2008/0015315 A1, U.S. Pat. No. 6,039,913, co-pending U.S. patent application Ser. Nos. 12/001,562, 12/001,521, 60/896,326, and 60/896,325, which are incorporated herein by references in their entireties.

In accordance with the present invention, a silicone hydrogel lens-forming material can also comprise a hydrophilic vinylic monomer. Nearly any hydrophilic vinylic monomer can be used in the actinically polymerizable composition for preparing the intermediary copolymer with pendant or terminal functional groups. Suitable hydrophilic vinylic monomers are, without this being an exhaustive list, hydroxyl-substituted hydroxyl-substituted $C_1$-$C_8$ alkylacrylates and methacrylates, acrylamide, methacrylamide, $C_1$-$C_8$ alkylacrylamides, $C_1$-$C_8$ alkylmethacrylamides, ethoxylated acrylates, ethoxylated methacrylates, hydroxyl-substituted $C_1$-$C_8$ alkylacrylamides, hydroxyl-substituted $C_1$-$C_8$ alkylmethacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)—(where the term "amino" also includes quaternary ammonium), mono(lower alkylamino)(lower alkyl) and di(lower alkylamino)(lower alkyl)acrylates and methacrylates, allyl alcohol, N-vinyl alkylamide, N-vinyl-N-alkylamide, and the like.

Among the preferred hydrophilic vinylic monomers are N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, Aminopropyl methacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, a $C_1$-$C_4$-alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, and N-vinyl caprolactam.

A silicone hydrogel lens-forming material can also comprises a hydrophobic monomer. By incorporating a certain amount of hydrophobic vinylic monomer in a polymerizable fluid composition, the mechanical properties (e.g., modulus of elasticity) of the resultant polymer may be improved. Nearly any hydrophobic vinylic monomer can be used in the actinically polymerizable composition for preparing the intermediary copolymer with pendant or terminal functional groups. Suitable hydrophobic vinylic monomers include, without limitation, $C_1$-$C_{18}$-alkylacrylates and -methacrylates, $C_3$-$C_{18}$-alkylacrylamides and -methacrylamides, acrylonitrile, methacrylonitrile, vinyl-$C_1$-$C_{18}$-alkanoates, $C_2$-$C_{18}$-alkenes, $C_2$-$C_{18}$-halo-alkenes, styrene, $C_1$-$C_6$-alkylstyrene, vinylalkylethers in which the alkyl moiety has 1 to 6 carbon atoms, $C_2$-$C_{10}$-perfluoroalkyl-acrylates and -methacrylates or correspondingly partially fluorinated acrylates and methacrylates, $C_3$-$C_{12}$-perfluoroalkyl-ethyl-thiocarbonylaminoethyl-acrylates and -methacrylates, acryloxy and methacryloxy-alkylsiloxanes, N-vinylcarbazole, $C_1$-$C_{12}$-alkylesters of maleic acid, fumaric acid, itaconic acid, mesaconic acid and the like. Preference is given e.g. to $C_1$-$C_4$-alkylesters of vinylically unsaturated carboxylic acids with 3 to 5 carbon atoms or vinylesters of carboxylic acids with up to 5 carbon atoms.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate, tris-trimethylsilyloxy-silylpropyl methacrylate, 3-methacryloxypropyl-pentamethyldisiloxane and bis(methacryloxypropyl)-tetramethyl-disiloxane.

A silicone hydrogel lens-forming material can further comprise an antimicrobial agent, preferably antimicrobial metal nanoparticles, more preferably silver nanoparticles.

In accordance with the present invention, a silicone hydrogel lens-forming material can further comprise various components, such as cross-linking agents, a chain transfer agent, initiator, UV-absorbers, inhibitors, fillers, visibility tinting agents (e.g., dyes, pigments, or mixtures thereof), a bioactive agent, a leachable lubricant, and the like, as known to a person skilled in the art.

Cross-linking agents may be used to improve structural integrity and mechanical strength. Examples of cross-linking agents include without limitation tetraethyleneglycol dimethacrylate (TEGDMA), triethyleneglycol dimethacrylate (TrEGDMA), ethyleneglycol dimethacrylate (EGDMA), diethylene glycol dimethacrylate, polyethylene glycol dimethacrylate, trimethylopropane trimethacrylate, pentaerythritol tetramenthacrylate, bisphenol A dimethacrylate, vinyl methacrylate, ethylenediamine dimethylacrylamide, glycerol dimethacrylate, triallyl isocyanurate, triallyl cyamurate, triallyl trimeliate, allylmethacrylate, and combinations thereof. A preferred cross-linking agent is ethylene glycol dimethacrylate (EGDMA), triallyl isocyanurate, or triallyl cyamurate.

The amount of a cross-linking agent used is expressed in the weight content with respect to the total polymer and is preferably in the range from 0.05 to 5%, and more preferably in the range from 0.1 to 2%.

Initiators, for example, selected from materials well known for such use in the polymerization art, may be included in the lens-forming material in order to promote, and/or increase the rate of, the polymerization reaction. An initiator is a chemical agent capable of initiating polymerization reactions. The initiator can be a photoinitiator or a thermal initiator.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronitrile (AIBN).

Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom D M Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups).

Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof.

The number-average molecular weight $M_n$ of the non-crosslinkable hydrophilic polymer is preferably from 5,000 to 500,000, more preferably from 10,000 to 300,000, even more preferably from 20,000 to 100,000.

In accordance with the invention, a lens-forming material is a composition which can be a solution or a melt at a temperature from about 20° C. to about 85° C. Preferably, a lens-forming material is a solution of all desirable components in water, or an organic solvent, or a mixture of water and one or more organic solvents.

A solution of all desirable components can be prepared by dissolving them in any suitable solvent known to a person skilled in the art. Example of organic solvents includes without limitation tetrahydrofuran, tripropylene glycol methyl ether, dipropylene glycol methyl ether, ethylene glycol n-butyl ether, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidione, and mixtures thereof.

In accordance with the invention, the lens-forming material can be introduced (dispensed) into a cavity formed by a mold according to any known methods.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711 to Schad; 4,460,534 to Boehm et at; 5,843,346 to Morrill; and 5,894,002 to Boneberger et al., which are also incorporated herein by reference.

Virtually all materials known in the art for making molds can be used to make molds for preparing ocular lenses. For example, polymeric materials, such as polyethylene, polypropylene, polystyrene, PMMA, cyclic olefin copolymers (e.g., Topas® COC from Ticona GmbH of Frankfurt, Germany and Summit, N.J.; Zeonex® and Zeonor® from Zeon Chemicals LP, Louisville, Ky.), or the like can be used. Other materials that allow UV light transmission could be used, such as quartz, glass, $CaF_2$, and sapphire.

In a preferred embodiment, reusable molds can be used and the mold containing the lens-forming material can be exposed to a spatial limitation of actinic radiation to crosslink the prepolymers. Examples of reusable molds made of quartz or glass are those disclosed in U.S. Pat. No. 6,627,124, which is incorporated by reference in their entireties. In this aspect, the lens-forming material is poured into a mold consisting of two mold halves, the two mold halves not touching each other but having a thin gap of annular design arranged between them. The gap is connected to the mold cavity, so that excess lens-forming material can flow into the gap. Instead of polypropylene molds that can be used only once, it is possible for reusable quartz, glass, sapphire molds to be used, since, following the production of a lens, these molds can be cleaned rapidly and effectively to remove unreacted materials and other residues, using water or a suitable solvent, and can be dried with air. Reusable molds can also be made of a cyclic olefin copolymer, such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced and high fidelity to the lens design.

After the lens-forming material is dispensed into the mold, it is polymerized to produce a contact lens. Crosslinking may be initiated in the mold e.g. by means of actinic radiation, such as UV irradiation, ionizing radiation (e.g., gamma or X-ray irradiation).

The crosslinking according to the invention may be effected in a very short time, e.g. in ≦60 minutes, advantageously in ≦20 minutes, preferably in ≦10 minutes, most preferably in ≦5 minutes, particularly preferably in 5 to 90 seconds and most particularly in 5 to 30 seconds.

Opening of the mold so that the molded article can be removed from the mold may take place in a manner known per se.

The molded contact lenses can further subject to further processes, such as, for example, surface treatment, sterilization, and the like.

A contact lens of the invention has an oxygen permeability of preferably at least about 35 barrers, more preferably at least about 60 barrers, even more preferably at least about 80 barrers. In accordance with the invention, an oxygen permeability is an apparent (directly measured when testing a sample with a thickness of about 100 microns) oxygen permeability.

A contact lens of the invention preferably has an elastic modulus of from about 0.2 MPa to about 2.0 MPa, preferably from about 0.3 MPa to about 1.5 MPa, more preferably from about 0.4 MPa to about 1.2, even more preferably from about 0.5 MPa to about 1.0 MPa.

A contact lens of the invention has an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min.

A contact lens of the invention further has a water content of preferably from about 15% to about 60%, more preferably from about 20% to about 55% by weight when fully hydrated. The water content of a silicone hydrogel contact lens can be measured according to Bulk Technique as disclosed in U.S. Pat. No. 5,849,811.

A contact lens of the invention has a surface hydrophilicity characterized by having an averaged water contact angle of about 90 degrees or less, preferably about 80 degrees or less, more preferably about 70 degrees or less, more preferably about 60 degrees or less.

The present invention, in a further aspect, provides a method for an actinically-crosslinkable polysiloxane copolymer of the invention, the method comprising the steps of: (a) mixing at least one hydrophilic vinylic monomer with a radical-generating polysiloxane having at least one phenone moiety and at least one first functional group to form polymerizable composition; (b) UV-irradiating the composition to form a chain-extended polysiloxane copolymer having the first functional group and at least one hydrophilic polymer chain extending from a portion of the phenone moiety attached to the polysiloxane copolymer; and (c) covalently attaching an ethylenically unsaturated group to the chain-extended polysiloxane copolymer by reacting it with an ethylenically-functionalizing vinylic monomer having a second function group which is co-reactive with the first functional group.

All of the various embodiments of phenone compounds, polysiloxanes with various functional terminal groups, coupling reactions, hydrophilic vinylic monomers, vinyl acetate, ethylenically unsaturated vinylic monomers can be used in this aspect of invention.

Preferably, the phenone moiety is a radical of formula (VII)

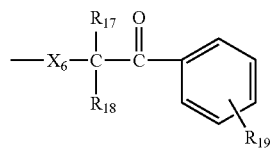

(VII)

in which $R_{19}$ is a linkage, H, $C_1$-$C_{12}$ alkyl, $C_1$-$C_{12}$ alkoxy, $C_1$-$C_{12}$ alkyl-NH— or —$NR_{20}R_{21}$ in which $R_{20}$ and $R_{21}$ independent of each other are $C_1$-$C_8$ alkyl; $R_{17}$ and $R_{18}$ independent of each other are hydrogen, $C_1$-$C_8$ alkyl, $C_1$-$C_8$ cycloalkyl, or $C_1$-$C_8$ aryl, or $R_{17}$ and $R_{18}$ together are (CH$_2$)$_u$— where u is an integer from 2 to 6; $X_6$ is a linkage selected from the group consisting of

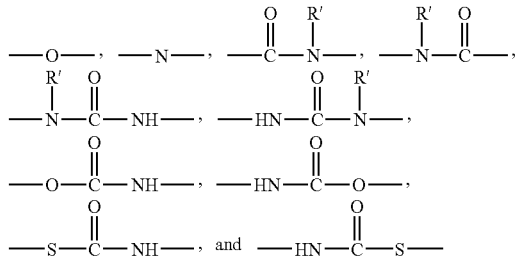

in which R' is H or $C_1$-$C_8$ alkyl. It should be understood that where R is a linkage, $X_6$ is terminated with H or $C_1$-$C_8$ alkyl.

The present invention, in a still further aspect, provides a non-crosslinkable polysiloxane copolymer (i.e., without any ethylenically unsaturated group) having a polysiloxane segment end-capped at both ends each with one hydrophilic polymer chain, which is useful as an internal wetting agent for making silicone hydrogel contact lenses with hydrophilic surfaces without post-curing surface treatment. Preferably, the non-crosslinkable polysiloxane copolymer is defined by formula (VIII)

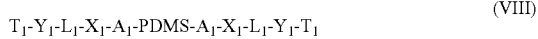

(VIII)

in which $Y_1$, $L_1$, $X_1$, $A_1$, and PDMS are defined as those in formula (I); and $T_1$ is a monovalent hydrophilic polymer chain composed of monomer units from one or more hydrophilic vinylic monomers with or without any functional group.

Nearly any hydrophilic vinylic monomer can be used in this aspect of the invention. Suitable hydrophilic vinylic monomers are, without this being an exhaustive list, hydroxyl-substituted hydroxyl-substituted $C_1$-$C_8$ alkylacrylates and methacrylates, acrylamide, methacrylamide, $C_1$-$C_8$ alkylacrylamides, $C_1$-$C_8$ alkylmethacrylamides, ethoxylated acrylates, ethoxylated methacrylates, hydroxyl-substituted $C_1$-$C_8$ alkylacrylamides, hydroxyl-substituted $C_1$-$C_8$ alkylmethacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)—(where the term "amino" also includes quaternary ammonium), mono(lower alkylamino) (lower alkyl) and di(lower alkylamino)(lower alkyl)acrylates and methacrylates, allyl alcohol, N-vinyl alkylamide, N-vinyl-N-alkylamide, and the like. Among the preferred hydrophilic vinylic monomers are N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, Aminopropyl methacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, a $C_1$-$C_4$- alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, and N-vinyl caprolactam.

A non-crosslinkable polysiloxane copolymer of the invention can be prepared as described above for actinically-crosslinkable polysiloxane copolymers, except with the third step (i.e., without the ethylenically-functionalizing step).

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

Example 1

Surface Hydrophilicity (Wettability) Tests

Water contact angle on a contact lens is a general measure of the surface hydrophilicity (or wettability) of the contact lens. In particular, a low water contact angle corresponds to more hydrophilic surface. Average contact angles (advancing) of contact lenses are measured using sessile drop method.

Oxygen permeability measurements. The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm³/min., while a nitrogen stream is passed on the opposite side of the lens at a rate of about 10 to 20 cm³/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters $O_2/cm^2$–minute]
$P_{oxygen} = (P_{measured} - P_{water} \text{ vapor}) = (\% O_2 \text{ in air stream})$
[mm Hg]=partial pressure of oxygen in the air stream
$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)

t=average thickness of the lens over the exposed test area (mm)

where $Dk_{app}$ is expressed in units of barrers. The oxygen transmissibility (Dk/t) of the material may be calculated by dividing the oxygen permeability ($Dk_{app}$) by the average thickness (t) of the lens.

Ion Permeability Measurements. The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm²/minute.

Example 2

Reaction of Epoxy Terminated PDMS with 2-Hydroxy-2-methyl-1-phenyl-propanone

2-Hydroxy-2-methyl-1-phenyl-propanone (Daracure 1173, from CIBA) (19.8791 grams) is mixed with 20.0231 grams of epoxy terminated polydimethylsiloxane (PDMS) (DMS-E09 from Gelest), 40 mL of methylene chloride and 0.1530 grams of borontrifluoride tetrahydrofuran complex. The temperature of the reaction mixture is increased from about 22° C. to about 33° C. after the reaction components are mixed. After about 30 minutes the temperature of the reaction mixture is decreased to about 27° C. After about 6 hours at room temperature about 10 mL of methanol is added into the reaction mixture and stirred continuously for several more minutes. The reaction mixture is diluted with about 100 mL of methylene chloride and extracted with 10% sodium carbonate solution (3×50 mL), extracted with water 2×50 mL and then dried over $MgSO_4$. The PDMS-macroinitiator is separated from MgSO4 and methylene chloride is removed by a method such as rotary evaporation. Steam distillation is used to remove excess 2-hydroxy-2-methyl-1-phenyl-propanone from the PDMS-macroinitiator. This is done by adding about 25 mL of water to the reaction mixture and then subjecting it to steam distillation. Additional 25 mL portions of water are added to the reaction mixture and steam distillation is continued until the distillate is clear. The PDMS-macro-initiator product recovered from the still pot is diluted with about 75 mL of methylene chloride, dried over $MgSO_4$ and filtered. About 21.54 grams of the PDMS-macroinitiator is obtained after methylene chloride is removed by rotary evaporation. FT-IR analysis of macroinitiator (neat) shows peaks near 3447, 3059, 2936, 1681, 1598, 1453, 1411, 1366, 1254, 1171, 1111, 1062, 958, 840, and 796 cm⁻¹. UV-VIS analysis of the macroinitiator in ethanol shows a strong absorption peak centered near 245 nm and a shoulder near 280 nm characteristic of a phenone derivative.

Example 3

Reaction of PDMS Macro-Initiator with DMA: Preparation of Poly(DMA)-PDMS-Poly(DMA)

About 5.02 grams of the PDMS-macroinitiator from Example 2 is combined with about 30.06 grams of N,N-dimethylacrylamide (DMA) and 100 mL of ethyl acetate in a plastic beaker. A stir bar is added to the mixture and the beaker is sealed with a polyethylene bag. The mixture is stirred while being irradiated with UVA light at an intensity of about 3.5 mW/cm². After being irradiated for a total of about 6 hours, the reaction mixture is inhibited with about 13 mg of 4-hydroxy-TEMPO dissolved in about 5 mL of ethyl acetate. The mass of the reaction mixture is adjusted to about 160 grams through the addition of ethyl acetate.

Example 4

IEM Functionalization of Poly(DMA)-PDMS-Poly(DMA)

About 140 grams of the copolymer solution from Example 3 are combined with about 2.599 grams of 2-isocyanatoethylmethacrylate (IEM), and about 0.182 grams of dibutyltindilaurate (DBTDL). The mixture is heated at about 40° C. for about one hour and then stored at room temperature. After being stored at room temperature for a about 18 hours, the isocyanate from IEM is nearly consumed as judged by FT-IR. About 3 mL of ethanol are added to the reaction mixture and then solvents are stripped by rotary evaporation. A small portion of the copolymer solution (~3 mL) mixture is mixed with a few drops of Daracure 1173 in a beaker and then exposed to UV light (~2.5 mW/cm$^2$). The sample does not gel within 15 minutes. Solvent is removed from the remaining copolymer solution by rotary evaporation and replaced with fresh ethyl acetate. The copolymer in fresh ethyl acetate is dosed with an additional 6.02 grams of IEM and 0.12 grams of DBTDL. After 3 days, excess IEM is quenched with the addition of about 10 mL of ethanol. The copolymer solution is filtered and the ethyl acetate is removed by rotary evaporation and replaced by ethanol. The solids content of the IEM functionalized copolymer of Poly(DMA)-PDMS-Poly(DMA) solution is determined gravimetrically to be about 35.6%.

Example 5

Lens formulation is prepared by mixing Betacon (25.91 grams), DMA (28.90 grams), TRIS (19.26 grams), Daracure 1173 (1.02 grams) and ethanol (24.98 grams). Contact lenses are prepared as described in Table 1.

Example 6

About 20 grams of Poly(DMA)-PDMS-Poly(DMA) in ethyl acetate from Example 3 is concentrated by rotary evaporation to near dryness at which point about 20 mL of ethanol is added to the copolymer. The sample is subjected to further solvent stripping by rotary evaporation followed by addition of fresh ethanol. This process is repeated once again and the sample is concentrated to 40.2% solids. A lens formulation is prepared by mixing 0.7401 grams of the 40.2% copolymer solution with 0.1102 grams of ethanol and 14.1656 grams of lens formulation from Example 5.

Example 7

Wetting Agent Made in Presence of Added Chain Transfer Agent (CTA)

About 5.03 grams of the PDMS-macroinitiator from Example 2 is combined with about 30.07 grams of DMA, 0.1312 grams of 1-dodecanethiol and 100 mL of ethyl acetate in a plastic beaker and then mixed until homogenous. A stir bar is added to the mixture and the beaker is sealed with polyethylene. The mixture is stirred while being irradiated with UVA light at an intensity of about 3.7 mW/cm$^2$. After being irradiated for a total of about 8 hours, the reaction mixture is inhibited with about 12 mg of 4-hydroxy-TEMPO dissolved in about 5 mL of ethyl acetate. The mass of the reaction mixture is adjusted to about 160 grams through the addition of ethyl acetate. The reaction mixture is combined with 2.69 grams of IEM and 0.1944 grams of DBTDL and heated at about 40° C. After about 1 hour an additional 2 grams of IEM is added. Additional IEM (about 7 grams) is added to the reaction mixture. About 23 hours after the last dose of IEM is added to the reaction mixture, isocyanate is still present as judged by FT-IR. Excess IEM is quenched with ethanol and solvents are removed by rotary evaporation. About 200 mL of ethanol is then added to the reaction mixture. The ethanol is removed from the reaction mixture by rotary evaporation and the resulting sample is subjected to further stripping for about one hour at about 10-20 mbar. An additional 200 mL of ethanol is added to the reaction mixture and the sample is concentrated to a solids content of about 55.7%.

Example 8

Lens formulation is prepared by combining 4.479 grams of a 55.7% solution of copolymer from Example 7 in ethanol with 0.0510 grams of Daracure 1173 and 0.5179 grams of ethanol. Contact lenses are prepared as described in Table 1.

Example 9

A lens formulation is prepared by combining 0.5522 grams of a 55.7% solution of copolymer in ethanol from Example 7 with 14.5561 grams of lens formulation from Example 5. Contact lenses are prepared as described in Table 1.

Example 10

A lens formulation is prepared by combining 1.3627 grams of a 55.7% solution of copolymer in ethanol from Example 7 with 13.6763 grams of lens formulation from Example 5. Contact lenses are prepared as described in Table 1.

Example 11

A lens formulation is prepared by combining 0.8516 grams of 35.6% copolymer solution from Example 4 with 14.1510 grams of lens formulation from Example 5. Contact lenses are prepared as described in Table 1.

Example 12

A lens formulation is prepared by combining 0.7401 grams of 40.2% copolymer solution from Example 6 with 14.1656 grams of lens formulation from Example 5.

Example 13

Reaction of PDMS-Macro-Initiator with NVP: Preparation of PVP-PDMS-PVP

About 5.06 grams of the PDMS-macroinitiator from example 2 is combined with about 20.00 grams of N-vinylpyrolidone (NVP) and 100 mL of ethanol in a plastic beaker and then mixed until homogenous. A stir bar is added to the mixture and the beaker is sealed with polyethylene. The mixture is stirred while being irradiated with UVA light at an intensity of about 4.0 mW/cm$^2$ (intensity near top of liquid). After being irradiated for a total of about 11 hours, the reaction mixture is inhibited with about 11 mg of 4-hydroxy-TEMPO dissolved in about 3 mL of ethanol. Ethanol is removed from the reaction mixture by rotary evaporation and 125 mL of dry tetrahydrofuran (THF) is added. The THF is removed by rotary evaporation and 125 mL of dry THF is added once again followed by rotary evaporation. Fresh THF (125 mL) is added a third time followed by rotary evaporation. The copolymer is then mixed with a 100 mL portion of dry THF and functionalized with IEM Example 14

Functionalization of PVP-PDMS-PVP with IEM: The THF copolymer solution from example 13 is mixed with 2.6897 grams of IEM and 0.2016 grams of DBTDL and stirred at room temperature. After more than 24 hours an additional 0.24 grams of IEM is added to the reaction mixture. After being stored for about 17 days isocyanate is not detected by FT-IR. The reaction mixture is diluted with 75 mL of ethanol. Solvents are removed by rotary evaporation and THF is exchanged with ethanol. THF is exchanged with ethanol by adding 75 mL portions of ethanol to the reaction mixture followed by rotary evaporation. The solids content of the reaction mixture is determined to be about 62.7% by gravimetric method.

Example 15

A lens formulation is prepared by combining 0.4957 grams (62.7% solution) of copolymer from example 14 with 14.5598 grams of lens formulation from Example 9 and 0.0625 grams of ethanol. Contact lenses are prepared as described in Table 1.

Example 16

A lens formulation is prepared by combining 1.2152 grams (62.7% solution) of copolymer from Example 14 with 13.6798 grams of lens formulation from Example 9 and 0.1538 grams of ethanol. Contact lenses are prepared as described in Table 1.

Example 17

A lens formulation is prepared by combining 4.7865 grams (62.7% solution) of copolymer from Example 14 with 0.0548 grams of Daracure 1173 and 0.1647 grams of ethanol. Contact lenses are prepared as described in Table 1.

TABLE 1

| Formulation Example # | Comment | Contact Angle of lenses. Standard deviation in parentheses |
|---|---|---|
| 5 | Control | 110° (2) |
| Evaluation of IEM functionalized Poly(DMA)-PDMS-Poly(DMA) wetting agent | | |
| 8 | Lens made from wetting agent | 30° (3) |
| 9 | 2% wetting agent (CTA type) in lens formulation. | 99° (3) |
| 10 | 4.9% wetting agent (CTA type) in lens formulation | 87° (3) |
| 11 | 2% wetting agent (non-CTA type) in lens formulation | 94° (6) |
| Evaluation of IEM functionalized Poly(NVP)-PDMS-Poly(NVP) wetting agent | | |
| 15 | 2% wetting agent in lens formulation | 101 (2) |

TABLE 1-continued

| Formulation Example # | Comment | Contact Angle of lenses. Standard deviation in parentheses |
|---|---|---|
| 16 | 5% wetting agent in lens formulation | 103 (5) |
| 17 | Lens made from wetting agent (~60%) in ethanol plus Daracure 1173 (0.9%). | 76 (5) |

Contact lenses are prepared from formulations in Examples 5, 8-11, 12, and 15-17 according to the following procedure: Polypropylene lens molds are filled with about 75 micro-liters of lens formulation and then irradiated with UV-light (UVA) for about 30 minutes at about 3.5 mW/cm². Lenses are extracted twice with isopropanol for about 30 minutes or more each time. The lenses are then extracted twice in de-ionized water for about 30 minutes or more, placed in glass vials containing PBS and sterilization. Varying degrees of haziness is observed in lenses containing wetting agents. After de-salination of lenses, advancing contact angle of de-ionized water on the lenses is determined.
Wetting agents were mixed with non-tinted lens formulation from Example 5 since copolymer such as that in Example 7 interacts with PCN-blue resulting in phase separation in which one phase enriched in PCN-blue.

Example 18

Reaction of Epoxy Terminated PDMS with 2-Hydroxy-2-methyl-1-phenyl-propanone

2-Hydroxy-2-methyl-1-phenyl-propanone (Daracure 1173, from CIBA) (41.7595 grams) is combined with 40.0456 grams of epoxy terminated polydimethylsiloxane (PDMS) (DMS-E12 available from Gelest), 100 mL of methylene chloride and 0.1536 grams of borontrifluoride tetrahydrofuran complex in a an amber jar. After about 90 minutes at room temperature about 100 mL of additional methylene chloride is added and the mixture was allowed to stir for about 2 days at which point an additional 50 mL of methylene chloride is added. The methylenechloride is then extracted with a 10% solution of sodium carbonate (3×75 mL), extracted with water (3×75 mL) and then dried over MgSO4

The PDMS-macroinitiator is separated from MgSO4 and methylene chloride is removed by rotary evaporation. Steam distillation is used to remove excess 2-hydroxy-2-methyl-1-phenyl-propanone from the PDMS-macroinitiator. This is done by adding about 250 mL of water to the reaction mixture and then subjecting it to steam distillation. Additional portions of water are added to the reaction mixture and steam distillation is continued until the distillate is clear. The PDMS-macro-initiator product recovered from the still pot is diluted with about 200 mL of methylene chloride, washed with water, separated from water, dried over MgSO4, filtered and then concentrated by rotary evaporation. Once the methylene chloride is removed from the recovered product (macroinitiator) is subjected to further stripping by rotary evaporation for about 45 minutes. About 23 grams of the PDMS-macroinitiator is obtained. Gel permeation chromatography (GPC) analysis of the PDMS-macro-initiator shows an increase in molecular weight as compared to the epoxy-terminated PDMS (DMS-E-12). The molecular weight of the PDMS-macroinitiator as measured by GPC is Mw=8366, Mn=3859. The molecular weight of the epoxy-terminated PDMS (DMS-E12) as measured by GPC is: Mw=2845, Mn=2022. During reaction of Daracure 1173 with epoxy-terminated-PDMS, some dimerization and or trimerization of PDMS units is believed to be contributing to the observed increase in molecular weight. FT-IR analysis of the PDMS-macro-initiator shows peaks characteristic of phenone and PDMS moieties. Select FT-IR peaks observed at about 3400, 2962, 2910, 2869, 1683, 1601, 1148, 1413, 1260, 1089, 1023, 799, and 703 cm$^{-1}$.

UV-VIS analysis of the macroinitiator in ethanol shows a strong absorption peaks centered near 207 nm, 244 nm and shoulder near 280 nm characteristic of a phenone derivative.

Example 19

Reaction of PDMS Macro-Initiator with DMA: Preparation of Poly(DMA)-PDMS-Poly(DMA)

PDMS-Macroinitiator from example 18 (5.0112 grams), is combined with DMA (12.0667 grams), 1-dodecanethiol (0.1448 grams), and about 100 mL of ethylacetate in a plastic beaker. A stir bar is added to the reaction mixture and the beaker was sealed with a polyethylene bag. The mixture is irradiated at about 3.3 mW/cm$^2$ of UVA light while being stirred over a six hour period. After about six hours of irradiation, about 7 mg of 4-hydroxy-TEMPO is dissolved in about 3 mL of ethylacetate is added to the reaction mixture.

Example 20

IEM Functionalization of Poly(DMA)-PDMS-Poly(DMA)

The copolymer solution from example 19 is combined with IEM (6.006 grams), dibutyltindilaurate (0.2042 grams) and heated at about 40° C. for about 4 hours followed by the addition of about 100 mL of ethanol. The reaction mixture is heated at 40° C., for an additional 3 hours and then concentrated by rotary evaporation. The ethyl acetate is exchanged with ethanol by repeated addition of ethanol to the reaction mixture followed by rotary evaporation. The reaction mixture is poured into about 500 mL of hexanes. The copolymer mixture is concentrated by rotary evaporation. Fresh ethanol is added to the copolymer mixture followed by rotary evaporation. GPC analysis of the reaction product shows Mw=9926, Mn=6590.

Example 21

A lens formulation is prepared by combining 6.5824 grams (53.8% solution) of copolymer from Example 20 with 0.0303 grams of Daracure 1173, and 0.4111 grams of ethanol. The components are mixed until homogenous. Plastic molds are filled with lens formulation and then irradiated with UVA light at about 3.5 mW/cm$^2$ for about 45 minutes. Lenses are harvested and then extracted and sterilized as described in table 1. Water contact angle (static) is found to be about 79°. Lenses are noted to be hazy and mechanically weak.

Example 22

Reaction of PDMS-Macro-Initiator with DMA and MMA: Preparation of Poly(DMA/MMA)-PDMS-Poly(DMA/MMA)

PDMS-Macroinitiator from example 18 (5.0605 grams) is combined with DMA (10.1524 grams), MMA (2.1592 grams), 1-dodecanethiol (0.1549 grams), and about 100 mL of ethylacetate in a plastic beaker. A stir bar is added to the reaction mixture and the beaker is sealed in a polyethylene bag. The mixture is irradiated at about 3.3 mW/cm$^2$ of UVA light while being stirred over a six hour period.

Example 23

IEM Functionalization of Poly(DMA/MMA)-PDMS-Poly(DMA/MMA)

A mixture consisting of about 6.1623 grams of IEM and 0.2316 grams of dibutyltindilaurate is added to copolymer solution from example 22. The vial used for IEM and dibutyltindilaurate is rinsed with about 5 mL of ethylacetate and the rinse is added to the reaction mixture. The reaction mixture is heated at about 40° C. for about 6 hours and then allowed to cool. The reaction mixture is diluted with about 100 mL of ethanol and then allowed to heat for about 6 hours at about 40° C. and then concentrated by rotary evaporation. The ethyl acetate is exchanged with ethanol by repeated addition of ethanol to the reaction mixture followed by rotary evaporation. The reaction mixture is concentrated until its total mass is about 50 grams. The reaction mixture is then poured into about 500 mL of hexanes and the precipitated solid is separated from solvents and placed in centrifuge tubes. Hexanes are added to the precipitates and the samples are mixed and then centrifuged. Solvent is separated from the solid and the solid is washed two additional times with hexanes. The solid product is dissolved in about 80 mL of 1-propanol and then concentrated by rotary evaporation. Additional 1-propanol is added to the copolymer followed by concentration by rotary evaporation to about 58% solids. The molecular weight of the sample is determined by gel permeation chromatography (GPC). GPC analysis shows Mw=21646, Mn=10219. The reaction product is analyzed by FT-IR. Select FT-IR peaks observed at 2930, 2871, 1722, 1641, 1546, 1499, 1453, 1402, 1361, 1260, 1141, 1105, 1059, and 803 cm$^{-1}$.

Example 24

A lens formulation is prepared by mixing 5.1690 grams (58.4% solution) of copolymer from Example 23 with 0.0381 grams of Daracure 1173. Plastic lens molds are filled with formulation, and then cured at about 3.5 mW/cm2 of UVA light for about 30 minutes. Lenses are harvested from molds, and then extracted and sterilized as described in table 1. Clear contact lenses with a water static contact angle of about 62° an advancing contact angle of about of about 67° and a receding contact angle of about 31° are obtained. The Dk$_{app}$ is about 35 barrer.

Example 25

PDMS-Macroinitiator from example 18 (10.0869 grams) is combined with DMA (19.3271 grams), MMA (3.9916 grams) and about 200 mL of ethylacetate in a plastic beaker. A stir bar is added to the reaction mixture and the beaker is placed inside a plastic bag. The bag containing the beaker is inflated with nitrogen and then deflated at total of 3 times prior to being sealed. The mixture is irradiated with at about 3.3 mW/cm$^2$ of UVA light while being stirred over a six hour period.

Example 26

The reaction mixture from example 25 is combined with 26 mg of 4-hydroxy-TEMPO, 12.0175 grams of IEM, 0.4150 grams of dibutyltindilaurate and then transferred to a glass reaction kettle. The mixture is heated at about 40° C. for about 4 hours under an air atmosphere. The reaction mixture is diluted with about 100 mL of ethanol and allowed to heat for an additional 4 hours at which point solvents are stripped by rotary evaporation. An additional 100 mL of ethanol is added to the reaction mixture and the sample is then concentrated. The reaction product is divided into three portions by placing sample in three 50 mL centrifuge tubes. The samples are washed with several 20-25 mL portions of hexanes by adding about 20-25 mL of hexanes to each centrifuge tube, shaking the tubes, centrifuging the samples and finally drawing off hexanes from the centrifuge tubes using a pipette. Copolymer sample obtained from the centrifuge tubes is placed in a flask and combined with about 200 mL of ethanol and about 15 mg of 4-hydroxy-TEMPO. The ethanol is exchanged with 1-propanol by adding 1-propanol to the mixture followed by rotary evaporation. The sample is concentrated and the percent solids of the sample is found to be about 67.8% by gravimetric analysis. The molecular weight of the sample is determined by gel permeation chromatography (GPC). GPC analysis shows Mw=26217, Mn=12582. FT-IR analysis shows peaks characteristic of amide, ester and PDMS moieties. FT-IR peaks observed near 3318, 2930, 1721, 1641, 1504, 1458, 1394, 1260, 1160, 1096, 1095, 809 $cm^{-1}$.

Example 27

A lens formulation is prepared by mixing 4.4319 grams (67.8% solution) of copolymer from Example 26 with 0.0288 grams of Daracure 1173 and 0.5991 grams of 1-propanol. Plastic molds are filled with about 75 microliters of formulation and then irradiated with UVB for about 20 second and then harvested from molds. Lenses are extracted and then sterilized as described in table 1. Clear contact lenses with a water static contact angle of about 54°, and advancing contact angle of about 74°, and receding contact angle of about 35° are obtained.

Example 28

Reaction of Epoxy Terminated PDMS with 4-(2-hydroxyethoxy)phenyl-(2-hydroxy-2-methylpropyl) ketone A solution consisting of 15.0461 grams of 4-(2-hydroxyethoxy)phenyl-(2-hydroxy-2-methylpropyl)ketone (Irgacure 2959 from CIBA) in about 200 mL of warm chloroform is placed in a reaction vessel. Epoxy terminated polydimethylsiloxane (47.0842 grams) (DMS-E21 from Gelest) is added to the chloroform solution along with an additional 50 mL of chloroform. The reaction mixture is stirred at room temperature and then 0.3168 grams of borontrifluoride tetrahydrofuran complex is added to it. The reaction mixture is stirred at room temperature for several more hours and then heated to about 40° C. for about 2 days. The reaction mixture is allowed to cool to room temperature and then extracted with a 10% solution of $Na_2CO_3$ (2×200 mL). The reaction mixture is then carefully extracted with warm water in a large open container (in order to avoid pressure build up) with a total of 12×250 mL of warm water. Chloroform extraction layers are periodically checked by FT-IR. The chloroform solution is dried over $MgSO_4$, filtered and then the chloroform is removed by rotary evaporation to yield about 39.50 grams of oily product. FT-IR analysis of the oily product shows peaks characteristic of phenone moieties (e.g. C=O phenone near 1668 $cm^{-1}$, C=C aromatic ring near 1602 $cm^{-1}$) and PDMS moieties (e.g. absorptions near 1093 $cm^{-1}$, 1023 $cm^{-1}$, 800 $cm^{-1}$. UV-VIS analysis of the macroinitiator in ethanol shows a strong absorption peaks centered near 220 nm, 274 nm and a tail near 320-360 nm characteristic of a phenone derivative.

Example 29

PDMS-macro-initiator (16.0908 grams) from example 28 is combined with 26.2587 grams of NVP and 500 mL of ethylacetate in a 1-liter plastic beaker containing a stir bar. The beaker is place in a plastic bag and the bag was inflated with nitrogen and then deflated a total of two times. The sample is stirred and irradiated at about 3.3 $mW/cm^2$ with UVA for a total of about 12 hours. The progress of the reaction is monitored periodically by FT-IR. FT-IR shows peaks characteristic of PDMS units and PVP moieties (for example, C=O from PVP units near 1678 $cm^{-1}$)

Example 30

The reaction product from example 29 is combined with IEM (4.2119 grams), dibutyltindilaurate (0.2298 grams) and 4-hydroxy-TEMPO (23 mg dissolved in about 5 mL of ethyl acetate). The reaction mixture is heated at about 40° C. for about 4 hours. FT-IR analysis of the reaction mixture shows the presence of NCO. The reaction mixture is dosed with additional IEM (about 1.14 grams) and heated at 40° C. After about 1 hour, the NCO peak is diminished but still visible by FT-IR. Additional dose of IEM is added to the reaction mixture and the sample is heated at 40° C. for about 4 hours and allowed to cool. An NCO absorption is not visible by FT-IR. Two additional doses of IEM (about 2.1 grams) are added to the reaction mixture and the sample is heated at 40° C. After the last dose of IEM, an NCO peak persists as measured by FT-IR. About 50 mL of ethanol are added to the reaction mixture and allowed to react with excess isocyanate prior to removal of solvents by rotary evaporation. The ethyl acetate is exchanged with ethanol by repeated addition of ethanol to the reaction mixture followed by rotary evaporation. The concentrated sample is poured into about 1 liter of de-ionized water and the resulting precipitate is collected. The precipitate is washed with water (4×100 mL), washed with petroleum ether (3×150 mL), washed with toluene (3×150 mL), and finally washed with 3×150 mL of petroleum ether. Residual petroleum ether and toluene are removed from the sample by repeated addition of 200 mL portions of ethanol to the sample followed by rotary evaporation. A few drops of the ethanol solution are spread on a NaCl disk and the resulting film is allowed to dry at about 40° C. for about 10 minutes. FT-IR analysis shows peaks near 1677 cm-1 (C=O from PVP units), 1720 cm-1 (C=O, ester units), 1093 (PDMS units), 1021 (PDMS units). The ethanol is exchanged with 1-propanol by adding 1-propanol to the reaction mixture followed by rotary evaporation until the percent solids is about 77.2%.

Example 31

A lens formulation is prepared by mixing 5.22318 grams of copolymer solution from example 30 with 1.1770 grams of DMA, 2.1642 grams of Trisacrylamide, 0.0244 grams of methylenebisacrylamide, 0.1069 grams of Daracure 1173, 1.4791 grams of 2-hydroxy-ethylacrylate and 1.4791 grams of 1-propanol. The formulation is mixed and then observed to be cloudy.

Example 32

Reaction of Epoxy Terminated PDMS with 4-(2-hydroxyethoxy)phenyl-(2-hydroxy-2-methylpropyl) ketone A solution consisting of 500 mL of chloroform, 30.1065 grams of 4-(2-hydroxyethoxy)phenyl-(2-hydroxy-2-methylpropyl)ketone (Irgacure 2959 from CIBA), 95.1156 grams of grams of epoxy terminated polydimethylsiloxane (DMS-E21 from Gelest), and 0.7680 grams of borontrifluoride tetrahydrofuran complex is heated at about 40° C. for about 24 hours. The solution is then heated to 70° C. for about 4 hours. The reaction mixture is allowed to cool to room temperature and then extracted with a 10% solution of $Na_2CO_3$ (4×250 mL). The reaction mixture is then carefully extracted with hot water in a large open container (in order to avoid pressure build up) with a total of 12×250 mL of hot water. and then extracted with 12×250 mL of hot water. Extraction layers are periodically checked by FT-IR. Extraction of the chloroform solution with hot water is continued until the total volume of water used is about 12 liters. Chloroform is stripped from the reaction product by rotary evaporation. About 50 mL of ethanol is added to the resulting sample followed by rotary evaporation. An additional 50 mL of ethanol is added to sample and then removed by rotary evaporation. After the ethanol is removed, the sample is subjected to further stripping by rotary evaporation at about 90° C. for about 30 minutes. The resulting sample is then divided and placed in two 50 mL centrifuge tubes. About 25 mL of petroleum ether is added to each sample followed by mixing and centrifugation. The clear liquid in the centrifuge tubes is collected and subjected to rotary evaporation. About 78.49 grams of product is recovered after solvent removal. FT-IR analysis shows peaks characteristic of phenone moieties and PDMS moieties.

Example 33

PDMS-macro-initiator (20.25 grams) from example 32 is combined with 25.20 grams of DMA and about 500 mL of ethylacetate in a 1-liter plastic beaker. The sample is placed on stir plate and stirred until homogeneous. The beaker is placed in plastic bag and the bag is inflated with nitrogen and then deflated at total of three times. The sample is irradiated at about 3.3 $mW/cm^2$ for about six hours. FT-IR analysis shows peaks characteristic of poly(DMA) blocks and PDMS units. About 27 mg of 4-hydroxy-TEMPO dissolved in about 3 mL of ethylacetate is added to the reaction mixture.

Example 34

The sample from example 33 is combined with a mixture consisting of 5.0091 grams of IEM and 0.2292 grams of dibutyltindilaurate and then heated at about 40° C. After 4 hours at about 40° C., an NCO absorption is diminished but still visible by FT-IR. About 10 mL of ethanol is added to the reaction vessel and heating continued for an additional hour. The NCO absorption is no longer visible by FT-IR. The copolymer solution is concentrated by rotary evaporation, diluted with about 75 mL of ethanol and concentrated further. Fresh ethanol (about 75 mL) is added to the copolymer solution two additional times followed by rotary evaporation. About 70 grams of recovered copolymer solution is gently washed with about 3×100 mL of heptane. The sample is further washed by adding more heptane followed by vigorous shaking. This results in the formation of an emulsion. The heptane is removed by rotary evaporation and the resulting gel is washed with 4×250 mL of de-ionized water. The copolymer sample is dissolved in about 100 mL of ethanol and concentrated by rotary evaporation. After most of the solvent is removed from the copolymer, fresh ethanol (~100 mL) is added to it followed by concentration by rotary evaporation. GPC analysis of copolymer that is recovered after evaporation of ethanol shows Mw=14041, Mn=7805. Addition of 1-propanol to copolymer solution in ethanol solution results in a cloudy appearance. The 1-propanol in the copolymer solution is exchanged with ethanol by adding ethanol followed by rotary evaporation. The copolymer solution is concentrated to about 70 grams and then precipitated in about 200 mL of water. The resulting gel is washed with 4×150 mL of petroleum ether and then subjected to rotary evaporation. About 50 mL of ethanol is added to the copolymer followed by concentration by rotary evaporation. The addition of about 50 mL portions of ethanol followed by rotary evaporation is repeated three more times. The copolymer solution is concentrated to about 63.7% solids. FT-IR analysis of a film cast on a NaCl plate followed by drying shows peaks near 3335, 2966, 2925, 2869, 1718, 1641, 1499, 1458, 1402, 1356, 1261, 1141, 1095, 1025, 870 $cm^{-1}$.

Example 35

A lens formulation is prepared by mixing 6.7323 grams copolymer sample from example 34 with 0.8868 grams of DMA, 0.3568 grams of ethanol, 0.4417 grams 2-hydroxyethylacrylate, 0.1182 grams of Daracure 1173, 0.0220 grams of methylenebisacrylamide, and 2.1844 grams of Tris-acrylamide. Contact lenses are prepared by filling plastic molds with about 75 microliters of lens formulation, and irradiating the formulations with UVB light at about 4 $mW/cm^2$ for about 20 seconds and for about 40 seconds. The lenses obtained after curing for 40 seconds are judged to be stronger than those cured for 20 seconds. Lenses are extracted and sterilized as described in table 1. All the lenses were noted to be slippery to the touch, but were also cloudy, blotchy and floppy. Sometime after mixing, the lens formulation begins to phase separate.

Example 36

A lens formulation is prepared by mixing 6.7918 grams copolymer sample from example 34 with 1.4290 grams of DMA, 0.3792 grams of ethanol, 0.3040 grams of 1H,1H,5H-octafluoropentylmethacrylate, 0.1214 grams of Daracure 1173, 0.0255 grams of methylenebisacrylamide, and 2.1234 grams of Trisacrylamide. Contact lenses are prepared by filling plastic molds with about 75 microliters of lens formulation, and irradiating the formulations with UVB light at about 4 $mW/cm^2$ for about 20 seconds and for about 40 seconds. The lenses obtained after curing for 40 seconds are judged to be stronger than those cured for 20 seconds. Lenses are extracted and sterilized as described in table 1. All the lenses are noted to be slippery to the touch, but are also cloudy, blotchy and floppy. Sometime after mixing, the lens formulation begins to phase separate.

Example 37

Reaction of Epoxy Terminated PDMS with 4-(2-hydroxyethoxy)phenyl-(2-hydroxy-2-methylpropyl) ketone A mixture consisting of 60.13 grams of 4-(2-hydroxyethoxy)phenyl-(2-hydroxy-2-methylpropyl)ketone (Irgacure 2959 from CIBA) in about 600 mL of chloroform is warmed until a homogenous solution formed. A solution consisting of 190.69 grams epoxy terminated PDMS (DMSE-21, from Gelest) dissolved in about 400 mL of chloroform is mixed with the chloroform solution containing 4-(2-hydroxyethoxy)phenyl-(2-hydroxy-2-methylpropyl)ketone. The reaction mixture is allowed to stir at room temperature for about 20 minutes and then borontrifluoride tetrahydrofuran complex (1.5152 grams) is added to the chloroform solution containing 4-(2-hydroxyethoxy)phenyl-(2-hydroxy-2-methylpropyl)ketone and epoxy terminated PDMS. The resulting mixture is stirred at room temperature for about 24 hours and then heated to about 40° C. for a total of about 48 hours. The reaction mixture is then extracted with a 10% sodium carbonate solution (2×300 mL). The reaction mixture is then carefully extracted with warm water in a large open container (in order to avoid pressure build up) with 1-liter portions of warm water until about 24 liters of water is collected. and then extracted with 12×250 mL of hot water. The reaction mixture is then extracted with 1-liter portions of warm water until about 24 liters of water are collected. FT-IR is utilized to periodically analyze the chloroform layer during the extraction process. Chloroform solution is concentrated at about 40° C. and then further concentrated at about 90° C. to remove residual water. The resulting PDMS-macro-initiator is diluted with about 500 mL of petroleum ether, filtered and then concentrated by rotary evaporation to yield about 150.32 grams of product. FT-IR analysis of the product shows peak absorptions characteristic of phenone moieties and PDMS moieties. FT-IR analysis shows peaks near 3456, 2963, 2904, 1666, 1601, 1446, 1409, 1260, 1089, 1021, 868, 800 cm$^{-1}$. UV-VIS analysis of the macroinitiator in ethanol shows a strong absorption peaks centered near 220 nm, 274 nm and a tail near 320-360 nm characteristic of a phenone derivative.

Example 38

Reaction of Epoxy terminated PDMS with 4-(2-hydroxyethoxy)phenyl-(2-hydroxy-2-methylpropyl) ketone A solution consisting of 120.08 grams of 4-(2-hydroxyethoxy)phenyl-(2-hydroxy-2-methylpropyl)ketone (Irgacure 2959 from CIBA) in about 1 liter of chloroform is prepared. A solution consisting of 380.74 grams epoxy terminated PDMS (DMSE 21, from Gelest) dissolved in about 500 mL of chloroform is mixed with the chloroform solution containing 4-(2-hydroxy-ethoxy)phenyl-(2-hydroxy-2-methylpropyl) ketone. An additional 500 mL of chloroform is added and the reaction mixture followed by warming until the mixture is homogenous. Borontrifluoride tetrahydrofuran complex (3.121 grams) is added to the chloroform solution containing 4-(2-hydroxyethoxy)phenyl-(2-hydroxy-2-methylpropyl) ketone and epoxy terminated PDMS and the resulting mixture is stirred at room temperature for about 4 hours and then heated to about 40° C. After 24 hours at about 40° C., the reaction mixture is refluxed for about 24 hours. The reaction mixture is then extracted with a 10% sodium carbonate solution (2×500 mL). The reaction mixture is then carefully extracted in a large open containing with 1-liter portions of hot water until about 24 liters of water are collected. FT-IR is utilized to periodically analyze the chloroform layer during the extraction process. Chloroform solution is removed by rotary evaporation at about 35° C. The samples is then further subjected to rotary evaporation at about 95° C. The resulting PDMS-macro-initiator is diluted with about 1000 mL of petroleum ether, filtered and then concentrated by rotary evaporation to yield 161.03 grams of product. FT-IR analysis of the product shows peak absorptions characteristic of phenone moieties and PDMS moieties. FT-IR analysis shows peaks near 3456, 2963, 2906, 1666, 1602, 1574, 1509, 1447, 1413, 1373, 1314, 1259, 1164, 1087, 1020, 865, 800 cm$^{-1}$. UV-VIS analysis of the macroinitiator in ethanol shows a strong absorption peaks centered near 220 nm, 274 nm and a tail near 320-360 nm characteristic of a phenone derivative.

Example 39

PDMS-macro-initiator (22.5826 grams) from example 37 is combined with DMA (22.5651), MMA (5.3851 grams), and about 500 mL of ethylacetate in a 1-liter plastic beaker. The sample is placed on stir plate and stirred until homogeneous. The beaker is placed in plastic bag and the bag is inflated with nitrogen and then deflated at total of three times. The sample is irradiated under UVA lights while being stirred for about 6 hours. The ethylacetate is exchanged with ethanol. The reaction mixture is concentrated to a mass of about 76 grams. The reaction product is precipitated by mixing the ethanol solution with about 500 mL of water. The product is separated from solvents and then washed with 4×250 mL of petroleum ether. Residual petroleum ether is removed by rotary evaporation and the product is dissolved in ethanol. The ethanol solution is concentrated and a film is cast on a NaCl disk. The film is dried under a stream of nitrogen for about 2 minutes. FT-IR peaks are observed near: 3374, 2963, 1721, 1684, 1641, 1558, 1500, 1452, 1401, 1358, 1321, 1297, 1261, 1164, 1094, 1023, 954, 864, and 801 cm$^{-1}$.

Example 40

The sample from example 39 is combined with 5.3523 grams of IEM and 0.2805 grams of dibutyltindilaurate. and then heated at about 40° C. The consumption of NCO from IEM units is monitored by FT-IR. After NCO is no longer visible by FT-IR, additional doses of IEM (4.205 grams) are added to the reaction mixture. This is continued until NCO absorption persists as measured by FT-IR. About 50 mL of ethanol is added to the reaction vessel and heating continues until NCO absorption is not visible by FT-IR. The copolymer solution is concentrated by rotary evaporation until a total mass of about 75 grams is obtained. The resulting solution is then mixed with about 500 mL of de-ionized water. The resulting precipitate is allowed to soak in the water overnight. The water mixture is then separated from the solid product. The copolymer is washed with 4×250 mL of petroleum ether and then subjected to rotary evaporation. The copolymer is mixed with about 200 mL of ethanol and then concentrated by rotary evaporation. A film of is prepared by spreading copolymer on a NaCl disk and drying the film under a stream of nitrogen. FT-IR analysis of the film shows peaks near: 3374, 2963, 1721, 1684, 1641, 1558, 1500, 1452, 1401, 1358, 1321, 1297, 1261, 1164, 1094, 1023, 954, 864, and 801 cm$^{-1}$.

Example 41

PDMS-macro-initiator (22.5827 grams) from example 37 is combined with DMA (22.5971), MMA (5.3380 grams), and about 500 mL of ethylacetate in a 1-liter plastic beaker. The sample is placed on stir plate and stirred until homogeneous. The beaker is placed in plastic bag and the bag is inflated with nitrogen and then deflated at total of three times. After being irradiated at about 3.6 mW/cm$^2$ for about 4.5 hours, reaction mixture is analyzed by FT-IR. A film is cast on NaCl and then dried under a stream of nitrogen for about 2 minutes. FT-IR peaks are observed near: 3482, 2963, 1726, 1641, 1497, 1456, 1414, 1400, 1357, 1261, 1095, 1024, 865, and 802 cm-1. After being irradiated for a total of about 6 hours the reaction mixture is concentrated by rotary evaporation at about 40° C. Fresh ethylacetate is added and the sample is concentrated to near dryness. The sample is dissolved in about 200 mL of ethylacetate.

Example 42

Chain Extension of Reaction of Product Form Example 41 with Diisocyanate (HDI) Followed by Reaction with IEM The sample from example 41 is combined with 0.3178 grams of hexamethylene-diisocyanate (HDI), 0.0798 grams of dibutyltindilaurate. Additional ethylacetate is added until the total mass of the mixture is about 250 grams. The mixture is heated at about 40° C. until isocyanate is no longer visible as measured by FT-IR. The copolymer is then functionalized by adding 5.0226 grams of IEM, 0.2233 grams of dibutyltindilaurate and 9 mg of 4-hydroxy-TEMPO to the reaction mixture followed by heating at about 40° C. Additional doses of IEM are added to the reaction mixture until the presence of isocyanate as measured by FT-IR persists. About 50 mL of ethanol is added to the reaction vessel and heating continued until NCO absorption is not visible by FT-IR. The copolymer solution is concentrated by rotary evaporation about 100 mL of solvent is collected. Fresh ethanol is added and the sample is concentrated to a mass of about 105 grams. The copolymer solution is subdivided into 50 mL centrifuge tubes and washed with 25 mL portions of water. The product is further washed with water until about 500 mL of liquid is collected from the wash process. The copolymer is then washed with 4×250 mL of petroleum ether. Petroleum ether is removed from the sample and about 200 mL of ethanol is added. The copolymer solution is concentrated by rotary evaporation until a mass of about 30 grams of sample remains. The copolymer solution is mixed with about 250 mL of de-ionized water. The sample is placed in centrifuge tubes and centrifuged to separate water from the solid. The solid is washed with 25 mL portions of water until about 250 mL of liquid is collected. The copolymer is dissolved in about 75 mL of ethanol and then concentrated by rotary evaporation. Fresh ethanol is added two more times followed by rotary evaporation. The concentration of copolymer in the ethanol is determined to be about 64% by gravimetric analysis. A total of about 17.79 grams of copolymer solution (64% in ethanol) is recovered.

Example 43

Reaction of Epoxy Terminated PDMS with 4-(2-hydroxyethoxy)phenyl-(2-hydroxy-2-methylpropyl) ketone A chloroform solution consisting of 15.8824 grams 4-(2-hydroxyethoxy)phenyl-(2-hydroxy-2-methylpropyl)ketone (Irgacure 2959 from CIBA) in about 300 mL of chloroform is prepared. Epoxy terminated-PDMS (DMSE-E21 from Gelest) (49.92 grams) is added to the solution of epoxy terminated-PDMS. The reaction mixture is stirred at about 25° C. and 0.2960 grams of borontrifluoride tetrahydrofuran complex is added. The mixture is stirred at about 25° C. for about 7 hours and then heated to about 40° C. for about 24 hours. The reaction mixture is extracted with 10% sodium carbonate solution (3×150 mL) and extracted with water (3×150 mL). The reaction mixture is concentrated by rotary evaporation, diluted with about 500 mL of water and subjected to distillation. About 200 mL of cloudy distillate is collected and the distillation is discontinued. The sample in the still pot is transferred to a separatory funnel and the aqueous layer is separated from the oily layer (PDMS-macroinitiator). The water layer is washed with hexanes and the hexane washes are added to the oily layer. The hexane solution containing the PDMS-macro-initiator is carefully extracted with hot water in a large open container. The hexane solution containing PDMS-macro-initiator is diluted with ethyl acetate (~700 mL), dried over magnesium sulfate, and filtered. Solvents are removed from the PDMS-macro-initiator by rotary evaporation. The PDMS-macro-initiator sample is divided and placed in two 50 mL centrifuge tubes. About 25 mL of hexanes are added to each sample followed by agitation and centrifugation. The liquid is removed from the centrifuge tubes and solvent is stripped by rotary evaporation to yield about 35 grams of product. FT-IR analysis of the sample shows peaks characteristic of phenone and PDMS moieties. Select FT-IR peaks are observed near: 3400, 2963, 1666, 1601, 1412, 1260, 1093, 1023, and 800 cm$^{-1}$.

Example 44

PDMS-Macroinitiator from example 43 (16.0535 grams) is combined with DMA (26.0529 grams), and about 460 mL of ethylacetate in a plastic beaker. A stir bar is added to the reaction mixture and the beaker is placed in plastic bag. The bag is inflated with nitrogen and then deflated a few times. The mixture is irradiated with at about 3.3 mW/cm$^2$ of UVA light while being stirred for about six hours.

Example 45

Copolymer solution from example 44 is mixed with IEM (4.0755 grams), dibutyltindilaurate (0.2215 grams) and then heated at about 40° C. After NCO is not visible by IR an additional dose of IEM (1.0137 grams) is added to the reaction mixture and heating is continued. Ethylacetate was exchanged with ethanol by stripping ethylacetate by rotary evaporation followed by the repeated addition of ethanol and rotary evaporation. After the sample was concentrated to about 100 grams, it was precipitated by mixing with petroleum ether. The sample is separated from the solvents, washed with petroleum ether, dissolved in ethanol and concentrated to about 59%. The ethanol is exchanged with 1-propanol by adding 1-propanol to the copolymer solution followed by repeated concentration by rotary evaporation. A film is cast on a NaCl disk and then dried under a stream of nitrogen for about 3 minutes. FT-IR analysis of the film shows peaks near 3504, 2929, 1717, 1639, 1498, 1457, 1431, 1401, 1356, 1297, 1261, 1142, 1096, 1058, and 804 cm$^{-1}$.

Example 46

A lens formulation is prepared by mixing 4.3869 grams of copolymer solution from example 41 with 0.0675 grams of Darcure 1173 and 0.2051 grams of ethanol. Plastic lens molds are filled with about 75 microliters of formulation and irradiated at about 4.4 mW/cm2 of UVA for about 15 minutes. Lenses are harvested, extracted and then sterilized as described in table 1. Lenses are noted to be brittle.

What is claimed is:

1. An actinically-crosslinkable linear polysiloxane copolymer, comprising at least one linear polysiloxane segment end-capped at least at one of the two ends of the polysiloxane segment with one hydrophilic polymer chain through a linkage and at least one ethylenically unsaturated group covalently linked to the linkage, wherein the hydrophilic chains is composed of one or more monomer units selected from the group consisting of units of N-vinyl-2-pyrrolidone (NVP), N,N-dimethylacrylamide (DMA), dimethylaminoethyl methacrylate, dimethylaminoethyl acrylate, vinyl alcohol, dimethylaminoethylmethacrylamide, a $C_1$-$C_4$-alkoxy polyethylene glycol (meth)acrylate having a weight average molecular weight of from 200 to 1500, N-vinyl-N-methyl isopropylamide, N-vinyl-N-methyl acetamide, and mixtures thereof.

2. The polysiloxane copolymer of claim 1, which is obtained by (a) mixing at least one hydrophilic vinylic monomer and/or vinyl acetate with a radical-generating polysiloxane having at least one phenone moiety and at least one first functional group to form polymerizable composition, wherein the hydrophilic vinylic monomer is selected from the group consisting of N-vinyl-2-pyrrolidone, N,N-dimethylacrylamide, dimethylaminoethyl methacrylate, dimethylaminoethyl acrylate, dimethylaminoethylmethacrylamide, a $C_1$-$C_4$-alkoxy polyethylene glycol (meth)acrylate having a weight average molecular weight of from 200 to 1500, N-vinyl-N-methyl isopropylamide, N-vinyl-N-methyl acetamide, and mixtures thereof; (b) UV-irradiating the composition to form a chain-extended polysiloxane copolymer having the first functional group and at least one monovalent hydrophilic polymer chain extending from a portion of the phenone moiety attached to the polysiloxane copolymer; and (c) covalently attaching an ethylenically unsaturated group to the chain-extended polysiloxane copolymer by reacting it with an ethylenically-functionalizing vinylic monomer having a second function group which is co-reactive with the first functional group.

3. The polysiloxane copolymer of claim 2, wherein the monovalent hydrophilic polymer chain comprises units of N-vinyl-2-pyrrolidone (NVP).

4. The polysiloxane copolymer of claim 2, wherein the monovalent hydrophilic polymer chain comprises units of N,N-dimethylacrylamide (DMA), dimethylaminoethyl methacrylate, dimethylaminoethyl acrylate, and/or dimethylaminoethylmethacrylamide.

5. The polysiloxane copolymer of claim 2, wherein the monovalent hydrophilic polymer chain comprises units of a $C_1$-$C_4$-alkoxy polyethylene glycol (meth)acrylate having a weight average molecular weight of from 200 to 1500.

6. The polysiloxane copolymer of claim 2, wherein the monovalent hydrophilic polymer chain comprises units of N-vinyl-N-methyl isopropylamide, N-vinyl-N-methyl acetamide.

7. The polysiloxane copolymer of claim 2, wherein the monovalent hydrophilic polymer chain comprises units of vinyl alcohol, wherein the units of vinylic alcohol are obtained by hydrolyzing units of vinyl acetate after said at least one ethylenically unsaturated group is covalently linked to the linkage by reacting the chain-extended polysiloxane copolymer with the ethylenically-functionalizing vinylic monomer having the second function group which is co-reactive with the first functional group.

8. A silicone hydrogel contact lens, comprising: a silicone hydrogel material and dangling hydrophilic polymer chains which are covalently anchored to the polymer matrix of the silicone hydrogel material, wherein the silicone hydrogel material is obtained by polymerizing a lens-forming material including an actinically-crosslinkable linear polysiloxane copolymer, wherein the actinically-crosslinkable linear polysiloxane copolymer comprises at least one linear polysiloxane segment end-capped at least at one of the two ends of the polysiloxane segment with a hydrophilic polymer chain through a linkage and at least one ethylenically unsaturated group covalently linked to the linkage, wherein the dangling hydrophilic polymer chains are derived from the actinically-crosslinkable polysiloxane copolymer, wherein the dangling hydrophilic polymer chains in the silicone hydrogel material is capable of imparting the silicone hydrogel contact lens a hydrophilic surface without post-curing surface treatment.

9. The silicone hydrogel contact lens of claim 8, wherein the actinically-crosslinkable linear polysiloxane copolymer is obtained by (a) mixing at least one hydrophilic vinylic monomer and/or vinyl acetate with a radical-generating polysiloxane having at least one phenone moiety and at least one first functional group to form polymerizable composition, wherein the hydrophilic vinylic monomer is selected from the group consisting of N-vinyl-2-pyrrolidone, N,N-dimethylacrylamide, dimethylaminoethyl methacrylate, dimethylaminoethyl acrylate, dimethylaminoethylmethacrylamide, a $C_1$-$C_4$-alkoxy polyethylene glycol (meth)acrylate having a weight average molecular weight of from 200 to 1500, N-vinyl-N-methyl isopropylamide, N-vinyl-N-methyl acetamide, and mixtures thereof; (b) UV-irradiating the composition to form a chain-extended polysiloxane copolymer having the first functional group and at least one monovalent hydrophilic polymer chain extending from a portion of the phenone moiety attached to the polysiloxane copolymer; and (c) covalently attaching an ethylenically unsaturated group to the chain-extended polysiloxane copolymer by reacting it with an ethylenically-functionalizing vinylic monomer having a second function group which is co-reactive with the first functional group.

10. The silicone hydrogel contact lens of claim 9, wherein the silicone hydrogel lens-forming material further comprises at least one component selected from the group consisting of a silicone-containing vinylic monomer, a silicone-containing macromer, a silicone-containing prepolymer, a hydrophilic vinylic monomer, a hydrophobic vinylic monomer, a hydrophilic prepolymer, a cross-linking agents, an antimicrobial agent, a chain transfer agent, radical initiator, UV-absorbers, inhibitors, fillers, visibility tinting agents, a bioactive agent, a leachable lubricant, and combination thereof.

11. The silicone hydrogel contact lens of claim 10, wherein the contact lens has at least one property selected from the group consisting of an oxygen permeability of at least about 35 barrers, an Ionoflux Diffusion Coefficient, D, of at least about $1.5 \times 10^{-6}$ mm$^2$/min, an elastic modulus of from about 0.3 MPa to about 1.5 MPa, a water content of preferably from about 15% to about 60%, an averaged water contact angle of about 70 degrees or less, and a combination thereof.

12. The silicone hydrogel contact lens of claim 10, wherein the monovalent hydrophilic polymer chain comprises units of N-vinyl-2-pyrrolidone (NVP).

13. The silicone hydrogel contact lens of claim 10, wherein the monovalent hydrophilic polymer chain comprises units of N,N-dimethylacrylamide (DMA), dimethylaminoethyl methacrylate, dimethylaminoethyl acrylate, and/or dimethylaminoethylmethacrylamide.

14. The silicone hydrogel contact lens of claim 10, wherein the monovalent hydrophilic polymer chain comprises units of a $C_1$-$C_4$-alkoxy polyethylene glycol (meth)acrylate having a weight average molecular weight of from 200 to 1500.

15. The silicone hydrogel contact lens of claim 10, wherein the monovalent hydrophilic polymer chain comprises units of N-vinyl-N-methyl isopropylamide, N-vinyl-N-methyl acetamide.

16. The silicone hydrogel contact lens of claim 10, wherein the monovalent hydrophilic polymer chain comprises units of vinyl alcohol, wherein the units of vinylic alcohol are obtained by hydrolyzing units of vinyl acetate after said at least one ethylenically unsaturated group is covalently linked to the linkage by reacting the chain-extended polysiloxane copolymer with the ethylenically-functionalizinq vinylic monomer having the second function group which is co-reactive with the first functional group.

17. A non-crosslinkable polysiloxane copolymer, comprising a polysiloxane segment end-capped at both ends each with one hydrophilic polymer chain, wherein the non-crosslinkable polysiloxane copolymer is free of ethylenically unsaturated group and which is obtained by (a) mixing at least one hydrophilic vinylic monomer and/or vinyl acetate with a radical-generating polysiloxane having at least one phenone moiety and at least one first functional group to form polymerizable composition, wherein the hydrophilic vinylic monomer is selected from the group consisting of N-vinyl-2-pyrrolidone, N,N-dimethylacrylamide, dimethylaminoethyl methacrylate, dimethylaminoethyl acrylate, dimethylaminoethylmethacrylamide, a $C_1$-$C_4$-alkoxy polyethylene glycol (meth)acrylate having a weight average molecular weight of from 200 to 1500, N-vinyl-N-methyl isopropylamide, N-vinyl-N-methyl acetamide, and mixtures thereof; (b) UV-irradiating the composition to form a chain-extended polysiloxane copolymer having the first functional group and at least one monovalent hydrophilic polymer chain extending from a portion of the phenone moiety attached to the polysiloxane copolymer; and (c) covalently attaching an ethylenically unsaturated group to the chain-extended polysiloxane copolymer by reacting it with an ethylenically-functionalizing vinylic monomer having a second function group which is co-reactive with the first functional group.

* * * * *